United States Patent
Yi et al.

(10) Patent No.: US 11,818,703 B2
(45) Date of Patent: *Nov. 14, 2023

(54) METHOD AND APPARATUS FOR DESIGNING BROADCAST CHANNEL FOR NR IN WIRELESS COMMUNICATION SYSTEM

(71) Applicant: LG Electronics Inc., Seoul (KR)

(72) Inventors: Yunjung Yi, Seoul (KR); Byounghoon Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

This patent is subject to a terminal disclaimer.

(21) Appl. No.: 17/544,553

(22) Filed: Dec. 7, 2021

(65) Prior Publication Data

US 2022/0095318 A1    Mar. 24, 2022

Related U.S. Application Data

(63) Continuation of application No. 16/064,969, filed as application No. PCT/KR2017/013616 on Nov. 27, 2017, now Pat. No. 11,219,036.

(Continued)

(51) Int. Cl.
*H04W 72/121* (2023.01)
*H04L 5/00* (2006.01)
*H04W 72/20* (2023.01)

(52) U.S. Cl.
CPC ......... *H04W 72/121* (2013.01); *H04L 5/0048* (2013.01); *H04W 72/20* (2023.01)

(58) Field of Classification Search
CPC ... H04L 5/0037; H04L 5/0048; H04L 5/0053; H04L 5/0064; H04L 5/1469;
(Continued)

(56) References Cited

U.S. PATENT DOCUMENTS

| 8,724,488 B2 | 5/2014 | Shin et al. |
| 2012/0087314 A1 | 4/2012 | Maeda et al. |

(Continued)

FOREIGN PATENT DOCUMENTS

| CN | 101809929 | 8/2010 |
| CN | 103052167 | 4/2013 |

(Continued)

OTHER PUBLICATIONS

Australian Office Action in Australian Appln. No. AU2017366081, dated Jul. 23, 2020, 7 pages.

(Continued)

*Primary Examiner* — Zhensheng Zhang
(74) *Attorney, Agent, or Firm* — Fish & Richardson P.C.

(57) ABSTRACT

According to the present invention, a common control signal via a group common control channel (GCCC) for a new radio access technology (NR) is defined. A user equipment (UE) receives the common control signal from a network via GCCC. The common control signal is for all UEs or a group of UEs in a cell. The UE handles the priority of the common control signal compared to other signals. For example, the priority of the common control signal may be higher than a semi-static UE-specifically configured configuration, and may be lower than a cell-commonly or group-commonly configured configuration.

16 Claims, 13 Drawing Sheets

Related U.S. Application Data

(60) Provisional application No. 62/565,068, filed on Sep. 28, 2017, provisional application No. 62/476,620, filed on Mar. 24, 2017, provisional application No. 62/473,451, filed on Mar. 19, 2017, provisional application No. 62/454,616, filed on Feb. 3, 2017, provisional application No. 62/452,392, filed on Jan. 31, 2017, provisional application No. 62/434,388, filed on Dec. 14, 2016, provisional application No. 62/426,326, filed on Nov. 25, 2016.

(58) Field of Classification Search
CPC ....... H04L 5/0007; H04L 5/0032; H04L 5/14; H04W 72/121; H04W 72/1278; H04W 72/1289

See application file for complete search history.

(56) References Cited

U.S. PATENT DOCUMENTS

| | | |
|---|---|---|
| 2013/0322413 A1 | 12/2013 | Pelletier et al. |
| 2015/0043496 A1 | 2/2015 | Kim et al. |
| 2016/0135146 A1 | 5/2016 | Schier et al. |
| 2016/0295594 A1 | 10/2016 | Cui |
| 2017/0105198 A1 | 4/2017 | Fu et al. |
| 2018/0213430 A1 | 7/2018 | Yokomakura et al. |
| 2019/0045506 A1 | 2/2019 | Takeda et al. |

FOREIGN PATENT DOCUMENTS

| | | |
|---|---|---|
| CN | 106063316 | 10/2016 |
| KR | 20110112789 | 10/2011 |
| RU | 2583043 | 5/2016 |
| WO | WO2015116866 | 8/2015 |
| WO | WO2016056970 A1 | 4/2016 |

OTHER PUBLICATIONS

CATT, "NR UL control channel structure," R1-1611394, 3GPP TSG RAN WG1 Meeting #87, Reno, USA, Nov. 14-18, 2016, 4 pages.
Chinese Office Action in Chinese Appln. No. 201780072807.8, dated May 17, 2021, 14 pages (with English translation).
Extended European Search Report in European Application No. 17874448.8, dated Oct. 7, 2019, 8 pages.
Indian Office Action in Indian Appln. No. 201917019435, dated Nov. 27, 2020, 7 pages (with English translation).
Japanese Office Action in Japanese Appln. No. 2019-528029, dated Aug. 25, 2020, 11 pages (with English translation).
LG Electronics, "Further discussion on common signaling," R1-1702474, 3GPP TSG RAN WG1 Meeting #88, Athens, Greece Feb. 13-17, 2017, 6 pages.
Nokia, "On the UL control channel structure for NR," 3GPP TSG-RAN WG1 #86 Bis, R1-1609740, Oct. 10-14, 2016, 8 pages.
Panasonic, "DL control channel design," R1-1612231, 3GPP TSG RAN WG1 Meeting #87, Reno, USA, Nov. 14-18, 2016, 4 pages.
Samsung, "DL Common Control Signaling," 3GPP TSG RAN WG1 #87, R1-1612525, Nov. 14-18, 2016, 4 pages.
ZTE, "Considerations on common control messages for MTC enhancement," R1-144820, 3GPP TSG RAN WG1 Meeting #79, San Francisco, US, Nov. 17-21, 2014, 7 pages.

FIG. 11
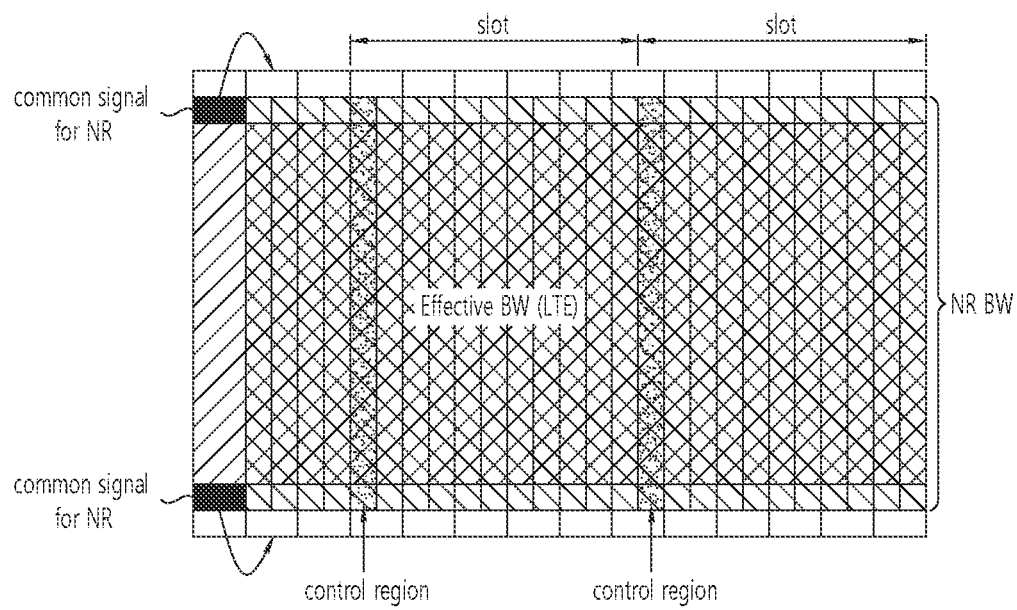
(a)
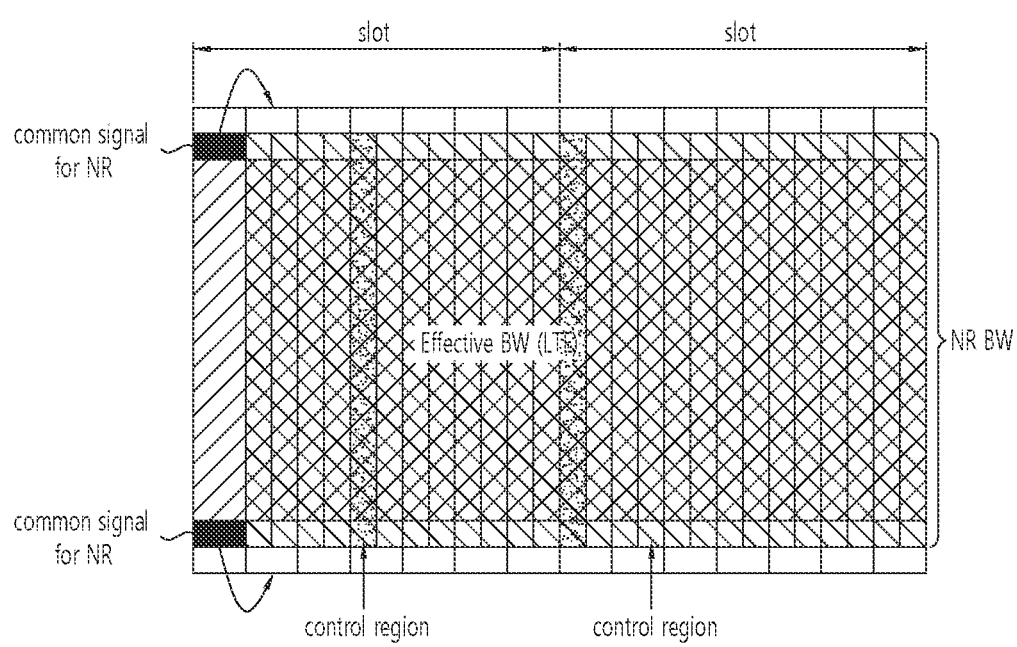
(b)

METHOD AND APPARATUS FOR DESIGNING BROADCAST CHANNEL FOR NR IN WIRELESS COMMUNICATION SYSTEM

CROSS-REFERENCE TO RELATED APPLICATIONS

This application is a continuation of U.S. application Ser. No. 16/064,969, filed on Jun. 21, 2018, which is a National Stage filing under 35 U.S.C. 371 of International Application No. PCT/KR2017/013616, filed on Nov. 27, 2017, which claims the benefit of U.S. Provisional Applications No. 62/426,326 filed on Nov. 25, 2016, No. 62/452,392 filed on Jan. 31, 2017, No. 62/454,616 filed on Feb. 3, 2017, No. 62/473,451 filed on Mar. 19, 2017, No. 62/476,620 filed on Mar. 24, 2017, No. 62/565,068 filed on Sep. 28, 2017, and No. 62/434,388 filed on Dec. 14, 2016, the contents of which are all hereby incorporated by reference herein in their entirety.

BACKGROUND OF THE INVENTION

Field of the Invention

The present invention relates to wireless communications, and more particularly, to a method and apparatus for designing a broadcast channel, e.g. group common or cell common, for a new radio access technology (NR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed. Particularly, NR bands may be operated in unpaired spectrum to maximize bandwidth, and thus may be operated in a wideband. When downlink and uplink resources are multiplexed by time division multiplexing (TDM) in the unpaired spectrum, to minimize UE power consumption, it is important to indicate resource direction which may be dynamically changed.

SUMMARY OF THE INVENTION

The present invention relates to wireless communications, and more particularly, to a method and apparatus for designing a broadcast channel, e.g. group common or cell common, for a new radio access technology (NR) in a wireless communication system. The present invention discusses a common physical downlink control channel (PDCCH) design for NR. The group or cell common signaling may be used to indicate resource direction between downlink and uplink, and also indicate other information related to UE assumptions on measurements, transmission, and control/data monitoring.

In an aspect, a method for handling priority of a common control signal by a user equipment (UE) in a wireless communication system is provided. The method includes receiving the common control signal from a network via a group common control channel (GCCC), wherein the common control signal is for all UEs or a group of UEs in a cell, and handling the priority of the common control signal compared to other signals.

In another aspect, a user equipment (UE) in a wireless communication system is provided. The UE includes a memory, a transceiver, and a processor, operably coupled to the memory and the transceiver, that controls the transceiver to receive the common control signal from a network via a group common control channel (GCCC), wherein the common control signal is for all UEs or a group of UEs in a cell, and handles the priority of the common control signal compared to other signals.

Group common or cell common broadcast channel for NR can be defined efficiently.

BRIEF DESCRIPTION OF THE DRAWINGS

FIG. 11 shows an example of patterns for coexistence of LTE and NR according to an embodiment of the present invention.

DESCRIPTION OF EXEMPLARY EMBODIMENTS

Figure 1:
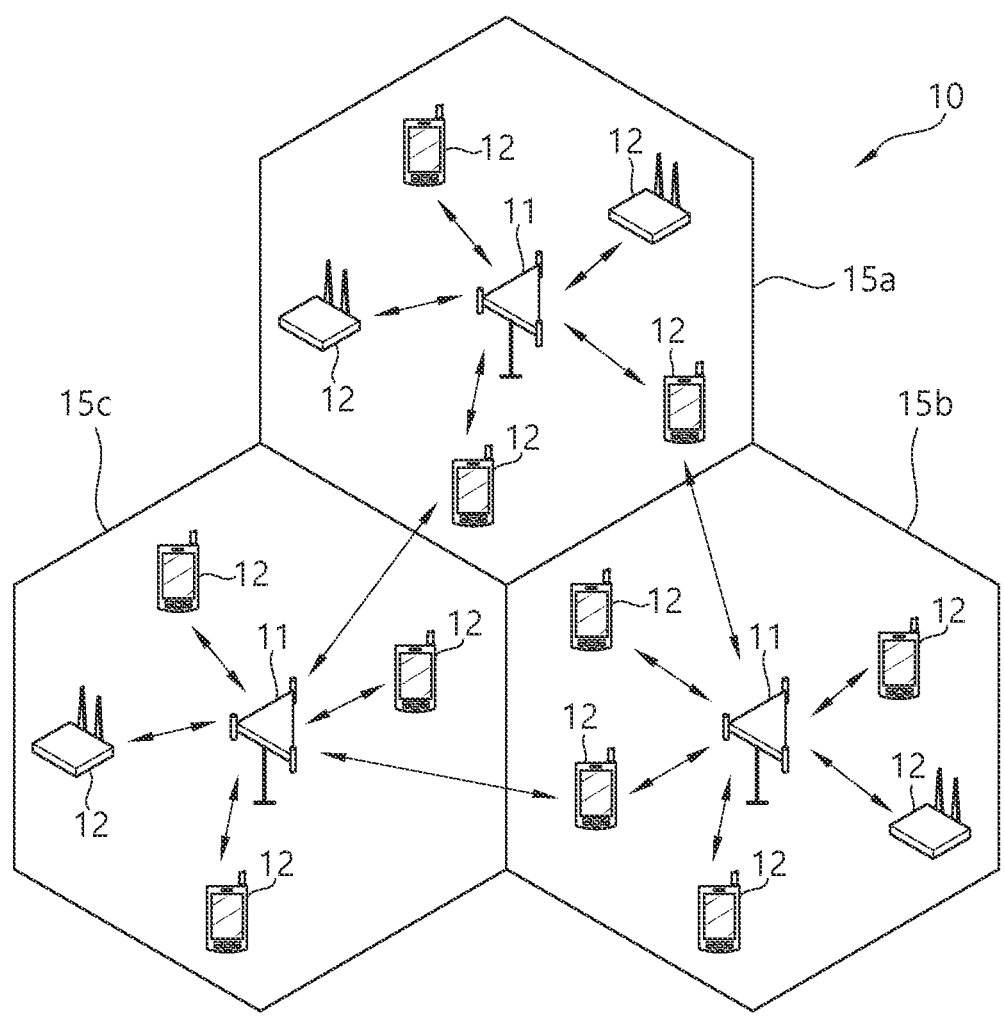
FIG. 1 shows a 3GPP LTE system.

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
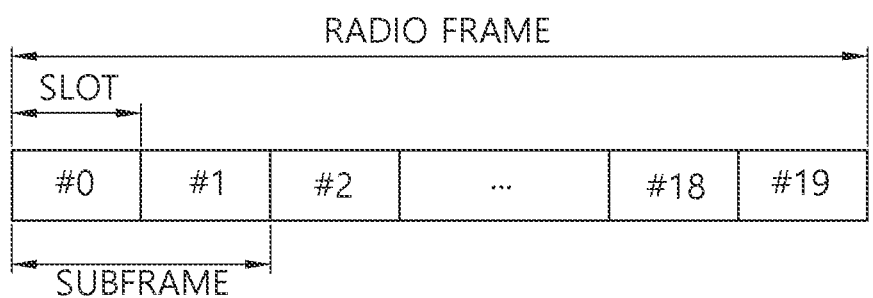
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
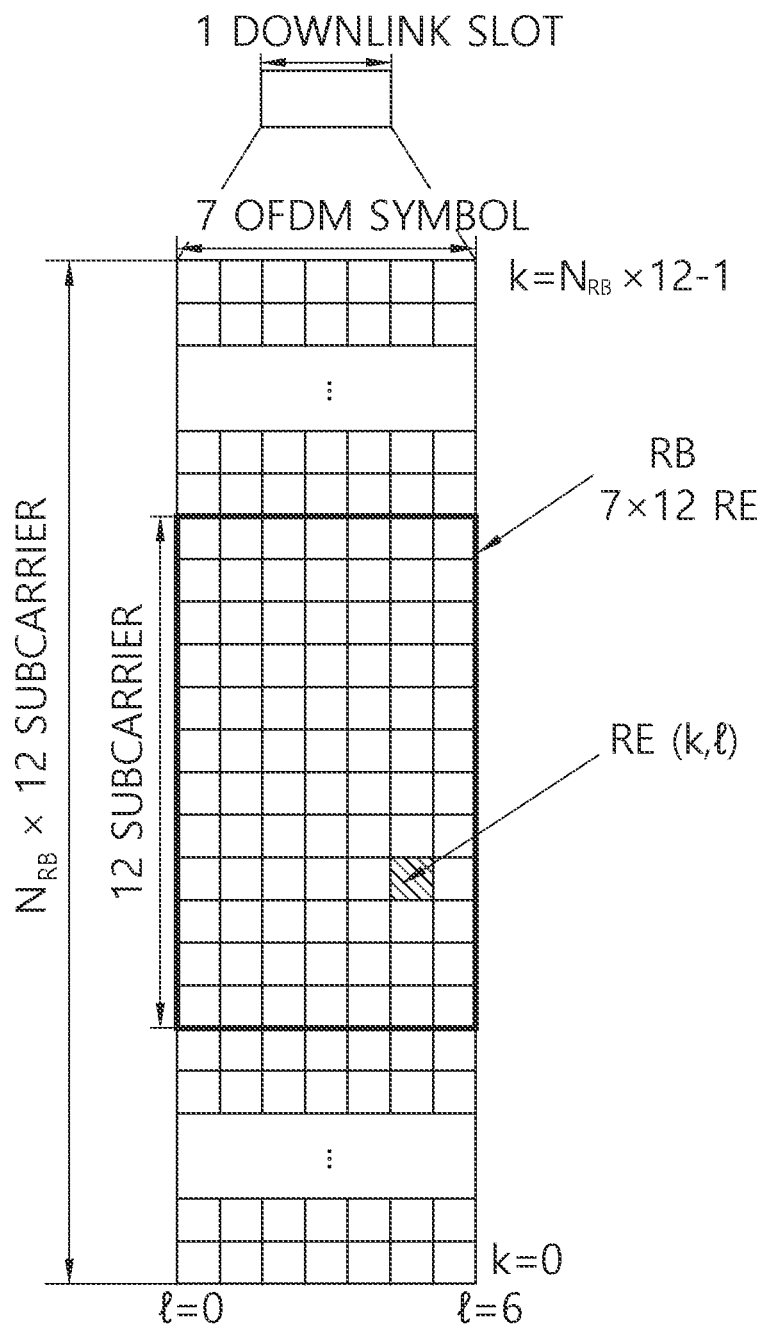
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N_{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

NR may use the OFDM transmission scheme or a similar transmission scheme. NR may follow the existing LTE/LTE-A numerology, or may follow the different numerology from the existing LTE/LTE-A numerology. NR may have a larger system bandwidth (e.g. 100 MHz). Or, one cell may support multiple numerologies in NR. That is, UEs operating in different numerologies may coexist within one cell in NR.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
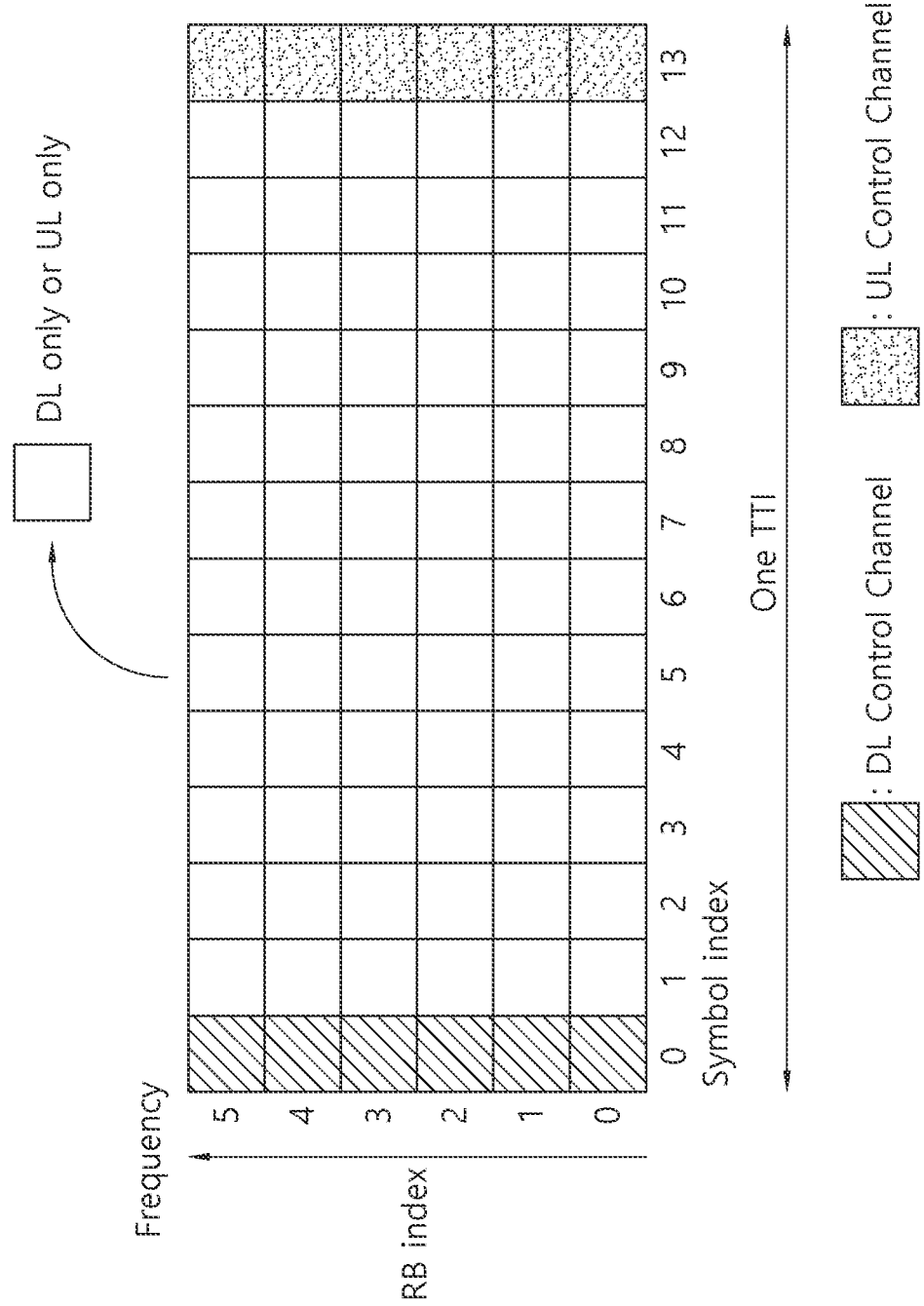
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. A region for DL control channel indicates a transmission area of a physical downlink control channel (PDCCH) for Downlink control information (DCI) transmission, and a region for UL control channel indicates a transmission area of a physical uplink control channel (PUCCH) for uplink control information (UCI) transmission. Here, the control information transmitted by the eNB to the UE through the DCI may include information on the cell configuration that the UE should know, DL specific information such as DL scheduling, and UL specific information such as UL grant. Also, the control information transmitted by the UE to the eNB through the UCI may include a hybrid automatic repeat request (HARQ) acknowledgement/non-acknowledgement (ACK/NACK) report for the DL data, a channel state information (CSI) report on the DL channel status, and a scheduling request (SR). The remaining symbols may be used for DL data transmission (e.g. physical downlink shared channel (PDSCH)) or for UL data transmission (e.g. physical uplink shared channel (PUSCH)).

According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Hereinafter, various aspects of designing a broadcast channel, e.g. group common or cell common, for NR are described according to embodiments of the present invention. In NR, single beam operation and/or multi beam operation may be expected. Furthermore, due to different bandwidth between different UEs, different data subband may be configured to different UEs. Also, different network entity with different transmission/reception points (TRPs) may transmit different information.

The present invention discusses efficient mechanism to indicate common signal (or, common information) to all UEs or a group of UEs in a cell. The group of UEs may be grouped based on e.g. one of the followings.

Data subband (or, bandwidth part (BWP)): UEs sharing the same data subband may be grouped together.

Primary TRP in charge: UEs may be grouped together based on the primary TRP which takes care of UEs.

Other reasons of UE grouping is not prohibited. For example, the network may separate UEs into different groups based on usage scenario (e.g. ultra-reliable and low latency communication (URLLC)/enhanced mobile broadband communication (eMBB)), UE capability (e.g. support NR/LTE coexistence or not), or numerology used for data transmission (e.g. 15 kHz or 30 kHz subcarrier spacing), etc. Particularly, when a UE supports multiple numerologies by TDM, numerology of group common signaling may also be different. And for that, numerology used in group common signaling may be configured/determined for each group. Further, subframe may be used interchangeably with slot in the present invention.

According to an embodiment of the present invention, contents of common signal is proposed. Contents of common signal may include at least one of the following information.

- Whether a type of the current subframe is UL-centric or DL-centric or UL or DL or reserved
- Whether a type of the next subframe type is UL-centric or DL-centric or UL or DL or reserved
- Whether a type of a few next subframe including the current subframe types are UL-centric or DL-centric or UL or DL or reserved
- Whether a type of a few next subframe types are UL-centric or DL-centric or UL or DL or reserved
- Whether the current subframe is scheduled with single-level DCI or two/multi-level DCI
- Whether the next subframe is scheduled with single-level DCI or two/multi-level DCI
- The size of common or group-specific shared control resource set
- The set of OFDM symbols or the set of search spaces or the set of candidates: The targeted UEs may be expected to monitor the set of OFDM symbols/search spaces/candidates at the current or next subframe
- The set of OFDM symbols and/or frequency regions: The targeted UEs may not be expected to monitor or use for control/data mapping the set of OFDM symbols/frequency regions. For example, forward compatibility resource or resource not usable for NR due to LTE/NR coexistence, etc., may be indicated.
- Reserved resource for different numerology UEs: This may be included in the above, or separate indication may also be possible.
- Reserved resource for sidelink or backhaul: This may be included in the above or separate indication may also be possible. More importantly, sidelink or backhaul link resource may be represented as 'reserved' or 'unknown' resource to regular access link UEs, as the resources are not usable for such UEs.
- Reserved resource for forward/backward compatible reasons, e.g. for LTE use in case of LTE-NR UL and/or DL sharing: Particularly UL, if a UE is connected to both LTE and NR in the same UL spectrum, time division multiplexing (TDM) on UL sharing may be considered, and resources allocated to the LTE UL transmission may be configured as reserved resource in perspective of NR UL.
- Indication of actual DL resource, UL resource and/or reserved resource: DL, UL and reserved resource may be indicated separately. For paired spectrum, reserved resource may be configured for DL and UL spectrum, separately. Further, there may be semi-statically configured reserved resource in frequency and/or time domain. Reserved resource may be called different names. For example, reserved resource may be called flexible resource, which means resource used for DL or UL flexibly. Or, reserved resource may be called unknown resource, which means resource of which the usage is not known until determined. When the signal is not available, all the resources may be unknown resources or flexible resources, which may be changed to different resource type.

For example, DL resource may have one of the following patterns.
- All DL slot
- Slot length—2 DL length
- Slot length—3 DL length
- Slot length—4 DL length
- Only control region DL length.
- Alternatively, other numbers may also be considered.

For UL resource, one of the following patterns may be considered.
- All UL slot
- Slot length—1—control region size UL length
- Slot length—2—control region size UL length
- Slot length—3—control region size UL length
- Configured UCI region size UL length (e.g. 1 or 2 or 3 or X depending on configuration).
- Alternatively, other numbers may also be considered.

For reserved resource, one of the following patterns may be considered.
- First X symbols: X may be higher layer configured.
- Bitmap pattern 1: For example, bitmap pattern 1 may be [0 0 0 0 1 1 1] in which reserved bits are reserved for the latter slot portion.
- Bitmap pattern 2: For example, bitmap pattern 2 may be [1 1 1 1 0 0 0] in which reserved bits are reserved for the first slot portion.
- The configuration of bitmap patterns may be semi-statically configured, and indices may be indicated via dynamic signaling.
- No reserved portion
- The entire slot is reserved
- In combination of DL, UL and reserved resource, the slot type may be defined as 'DL(s)—Unknown(s)—UL(s)' for each slot. Each DL or Unknown or UL may have 0, 1, 2 . . . 14 symbols in each slot, but total number of symbols in each slot may be restricted as 14. When multiple DL-UL switching occurs, 'DL—Unknown—UL' pattern may be applied to 7 OFDM symbols instead of 14 OS or 4/3 symbols within 7 OFDM symbols case (for 2, 4 switching, respectively). In other words, slot type or sub-slot type may start with zero or more DL symbols and end with zero or more UL symbols. And, undefined symbols may be treated as unknown resources or reserved resources.
- A set of beam pairs or transmission beams used in the next few slots: To minimize UE blind detection overhead, a sequence of transmission beam in a slot or over a next few slots may be indicated. This information may be transmitted per each beam. This information may be transmitted in slot in which control channels are transmitted via beam sweeping of multiple beams, regardless of actual scheduling or common data scheduling. In other words, the information may be transmitted along with common data.

The proposals in the present invention may also be applied to the case when a UE acquires slot formation via semi-static signaling. The semi-static signaling may be indicated cell-specifically, UE-group-common or UE-specifically. Particularly, reserved resource may be configured semi-statically, and dynamic indication may not carry explicit indication on the reserved resource. In case of semi-static configuration, the patterns of slot formats may be used, and the behavior of a UE may be similar as presented in the present invention.

A slot type may be indicated by a bitmap for each or a set of OFDM symbols, and each bit may represent either DL or UL (or DL or UL or reserved resource). When DL/UL is used for type indication of each or a set of OFDM symbols, DL may include either DL or reserved resource. Alternatively, UL may include either UL or reserved resource. In other words, reserved resource may be expressed either DL or UL, if two type indications are used. Moreover, the number of OFDM symbols belonging to each set or each bit or the size of bitmap representing each slot may be configured by higher layer. The set of OFDM symbols corresponding to one bit in the bitmap may be 1 to slot size. When one slot type indication is for a set of slots instead of one slot, a set of OFDM symbols within the set of slots may be defined. The number of slots indicated by one slot type indication may also be configured by higher layer.

When multiple purposes of indication are achieved and one common signal may be scheduled with a radio network temporary identity (RNTI), a UE may search more than one RNTI to locate the necessary information. Each common signal based on each RNTI may have different functionality. For example, for a URLLC UE, reserved resource for eMBB but not reserved for URLLC UE may be available for transmission/reception of URLLC traffic. Also, for example, UEs with triggered channel state information reference signal (CSI-RS) may assume that the subframe/slot may transmit CSI-RS, whereas UEs with semi-static or persistent CSI-RS configuration may assume that the subframe/slot may not transmit CSI-RS if the subframe is indicated as UL-centric. Though, it is highly possible that the location of CSI-RS transmission may be different. Common signal may be applicable to UEs with slot-based scheduling only or may also be applicable to UEs with mini-slot based scheduling as well, depending on its configuration. When a UE is configured with mini-slot, it may be indicated whether common signal is also applicable to mini-slot scheduling or not. More generally, different RNTI or search space may be configured for mini-slot based scheduling to transmit common signal, if different group-common scheduling is applied. Depending on slot based or mini-slot based scheduling, a UE may apply different information for different group-common control channel.

According to an embodiment of the present invention, combination of different information is proposed. Though one physical channel is used, different information set or information may be transmitted in each incident depending on the configuration. For example, slot type, information of DL/UL/reserved resource may be indicated with different periodicity. For example, slot type may be transmitted with a periodicity which is applied during the interval, and information of DL/UL/reserved resource may be transmitted aperiodically or with different periodicity which is applied only on the same slot. Depending on the configuration, different content of common or group-common control channel may be expected. Also depending on its content, even though the channel itself is same (regarding channel coding, mapping, DCI format, etc.), the mapped candidate may be different. For example, slot type may be indicated in any candidate in the group common or common search space. However, if dynamic signaling on the number of OFDM symbols is indicated, it may be mapped to the first or pre-fixed or semi-statically configured candidate index so that it can be obtained without any blind decoding (to minimize latency).

According to an embodiment of the present invention, signal transmission periodicity in time is proposed. The following mechanisms may be considered for indication of common signal. In the below description, the common signal refers a group or cell-specific signal which are applicable to all UEs or a group of UEs in a cell, depending on how the signal is designed. If multiple common signals are used for different purposes or different UEs, one or more of the following mechanisms may be jointly used.

(1) The Indication May be Done at the Current Subframe

The indication may have higher priority than semi-statically configured signals, such as semi-static configuration of sounding reference signal (SRS) transmission.

The indication may have lower priority than dynamically indicated scheduling. The UE may ignore common signal if the scheduling says otherwise. In the dynamic indication has been transmitted "x" slots/subframes before, common signal may have higher priority than dynamically indicated scheduling. In other words, dynamically indicated scheduling occurred in the same subframe/slot may have higher priority than common signal. Otherwise, common signal may have higher priority than the dynamically indicated scheduling. In other words, the most recent signaling may always have the highest priority than other signaling, regardless of common/UE-specific and/or dynamic/semi-static signaling. Alternatively, as common signal may not be received by UE, the UE-specific dynamic signaling may always have higher priority than common signal.

If the indication is not given, a UE may always assume that common signal is present. Thus, if common signal is not present, the current subframe/slot may not be valid or the resource type(s) within a slot may not be determined. Alternatively, a UE may opportunistically assume that common signal may be present. If common signal is not present, the default configuration or previous subframe/slot's configuration may applied in the subframe/slot. Default configuration may be given per UE or UE-group or per cell. Alternatively, a UE may not be required to read common signal. That is, it may be a UE capability to read common signal. If a UE does not have capability to read common signal, fallback behavior for a UE may be used. Alternatively, a UE may assume different value for each field or each indication to avoid any negative impact on the network side.

If common signal is supposed to be present in every subframe, and common signal is not detected at the first OFDM symbol of a slot, the UE may search common signal in the next OFDM symbol. The UE may assume that the first OFDM symbol is blank OFDM symbol if common signal is not detected. More generally, this common signal may be transmitted in every symbol to indicate whether the current symbol is valid or invalid.

(2) The Indication May be Done Before the Subframe

For example, to indicate whether the first OFDM symbol is blank/reserved or not, indication before the current slot/subframe may also be considered. Furthermore, to minimize latency, common signal may be transmitted before the current slot/subframe. Also, to adapt the network bandwidth, bandwidth may also be indicated before the actual transmission. Also, if the network wants to dynamically reconfigure or change the frequency region in which common signal is transmitted, common signal may be transmitted before. Common signal may indicate the following subframe/slot, and multiple indication may be possible.

In terms of priority, similar priority described above may be applied to this case as well.

(3) The Indication May be Done at the End of Current Subframe or at the Beginning of Next Subframe For example, the indication cannot be transmitted before or some changes may occur during the slot/subframe. In this case, the indication from the next or at the end of current subframe may also be considered. The end of slot/subframe may refer the last OFDM symbol(s) of the slot/subframe or the last OFDM symbol(s) of the DwPTS (DL portion)

excluding guard period and/or UL portion. The signal for this may include backward indication of reserved signal or punctured resource. If common signal is transmitted at the end of slot/subframe, data rate matching may be needed. One of the following options may be considered for data rate matching.

Data rate matching may always be performed on the common or group common control channel.
   Data rate matching may be performed only on the resource used by the detected common or group common control channel(s).
   Data rate matching may not be performed and common or group common control may perform puncturing.
   One options among different option may be configured by the network.
   Common signal may be transmitted within the reserved resource or guard period so that data rate matching is not subject to the transmission of common or group common control channel. The similar approach may be considered for the case that common or group common control channel is transmitted in a fixed time/frequency location within a slot (e.g. fixed by search space candidate, fixed by frequency resource or fixed by time/frequency resource, etc.), and control channels may be transmitted cross the common or group common control channel resource. In such case, data rate matching on control channel may be done by similar approach as mentioned above.

(4) The Indication May be Done Simultaneously at the Current and Next Subframe

Depending on indication type, indication to either current or next slot/subframe or both current/next subframe may also be considered. This may be effective when the first OFDM symbol of next subframe/slot may be reserved or resource in which common signal is transmitted is reserved.

(5) The Indication May be Done Simultaneously at the Current Subframe and/or Future Similar to the above option, but the indication may be dynamically changed to indicate only current subframe, or only next subframes or both. To differentiate, one field may be present to indicate which indication is used in common signal.

(6) The indication may be done periodically. Particularly with (4)/(5), different number of slots/subframes may be indicated per each indication.

In this case, discontinuous reception (DRX) UEs in On_Duration may not be expected to receive common control channels, or may not be expected to change or apply certain behaviors based on the common signal. In other words, operation without reading the common or group common control channel may be performed particularly for DRX UEs.

(7) The indication may be done via media access control (MAC) control element (CE) activation/deactivation.

(8) The indication may be done periodically/aperiodically for multiple subframes/slots In this case, the indication may also include the duration for which indication is applied. Or, the indication may have a bitmap field to indicate which next subframes are applied with the indicated information.

(9) Similar to enhanced interference management and traffic adaptation (eIMTA) DCI, within certain interval (which may be configured by higher layer), one or multiple times of common or group common control channels may be transmitted. If multiple times of transmission occur within one period/interval, the same information may be carried. This is to enhance the reliability and also to handle DRX UEs. More particularly, if common signal is configured to be transmitted periodically, considering that the resources may not be available due to reserved/UL, duration/window within each period where a UE can monitor multiple occasions of control transmission may be configured to increase the opportunities of common signal transmission.

According to an embodiment of the present invention, handling different information between semi-static configuration and a common PDCCH or between dynamic scheduling DCI and a common DCI is proposed. Common PDCCH may be called another name, e.g. common or group control channel (GCCC). Depending on the content, different handling seems necessary if the GCCC indicates different information from the known information by semi-static configuration or by dynamic scheduling. For example, if a slot type includes guard/reserved period which can be used for certain applications such as URLLC, URLLC UEs need to assume that reserved portions may be used for URLLC based on dynamic scheduling. Another issue is how to handle grant-free resource whether this may be transmitted in DL/reserved resource indicated by the GCCC or not. Generally, when the network indicates DL resource for the grant-free resource portion, grant-free transmission may not be successfully received by the network regardless whether the UE transmits or not. In this sense, it is generally better to assume that grant-free resource may be cancelled by the GCCC. However, URLLC UEs can still utilize the reserved resource. To address this issue, separate slot type indication may be given to different UEs (e.g. eMBB UEs and URLLC UEs). Or, a UE may assume that semi-statically configured UL resources are valid unless the portions are reclaimed as DL. If preemption indication is used, a GCCC may override the scheduling DCI.

However, to support very reliable/low latency URLLC UEs, some grant-free resources may be reserved and cannot be cancelled by any common signal or dynamic signaling, unless reconfiguration is done. UEs granted to utilize such resource may ignore GCCC signal for grant-free resource determination.

In terms of overall priority, the following options may be considered. Semi-static configuration in flexible resource may or may not be changed by GCCC. The flexible resource may be determined by the resource which is not indicated as fixed DL resource or fixed UL resource by semi-static DL/UL assignment, which may be transmitted in remaining system information (RMSI)/on-demand system information (OSI) and/or UE-specific signaling. DL/UL assignment may be given to a SCell via UE-specific signaling. In UE-specific signaling, different DL/UL assignment may be possible. Cell-common DL/UL assignment may be transmitted via cell-specific signaling such as RMSI/OSI, and UE-specific may be transmitted via UE-specific signaling. As there may be different behavior depending on the characteristic of DL/UL assignment, the type needs to be separated at SCell configuration. It may also be differentiated whether it is included in SIB or not.

(1) GCCC may have the lowest priority. Unless there is no conflict, a UE may apply the configuration indicated by the GCCC.

(2) GCCC may have the highest priority. For the configured RNTI to read GCCC, the information may have higher priority compared to other dynamic DCI or semi-static configuration.

(3) GCCC may have the higher priority than the UE-specifically configured configuration, may have the lower priority than the cell-commonly configured configurations or group-commonly configured configurations, and may have the lower priority than the UE-specifically dynamically configured configurations. In terms of dynamic DCI, the priority may also be determined based on effective timing. If common signal is applied or transmitted after the dynamic DCI, common signal may have higher priority than the dynamic DCI. For example, if dynamic DCI schedules cross-subframe/slot scheduling at k-slots afterwards where common signal is transmitted between n and n+k slots, common signal may have higher priority than the dynamic DCI. Or, to minimize ambiguity or uncertainty about whether a UE has received the common signal or not, the dynamic DCI may have the higher priority than GCCC regardless of timing.

More generally, the following options may be considered for the collision case between GCCC and semi-statically configured resources, particularly in perspective of slot indication. When no collision occurs (i.e. information carried in GCCC and semi-static configuration does not conflict), information in each is obeyed.

(1) Option 1: GCCC may always override semi-static resource including physical broadcast channel (PBCH)/primary synchronization signal (PSS)/secondary synchronization signal (SSS) resources. Even though PBCH/PSS/SSS resources are semi-statically or predefined, it may be changed by GCCC. When a UE detects GCCC which indicates OFDM symbols for PBCH/PSS/SSS are DL, resources for PBCH/PSS/SSS may be reserved for PBCH/PSS/SSS so that data may be rate matched around those reserved resources. If GCCC indicates UL, a UE may assume that resources for PBCH/PSS/SSS may not be used for PBCH/PSS/SSS and may be preempted by UL transmission.

(2) Option 2: GCCC may override most semi-static resources with exceptions. Exceptions may include one or more PBCH/PSS/SSS/control region/grant-free resources.

(3) Option 3: GCCC cannot override semi-static resource, at least configured cell-specifically or group-specifically. In other words, configuration by system information block (SIB)/PBCH may not be changeable, whereas UE-specific configurations (e.g. CSI-RS) may be changed or overridden by GCCC. In other words, GCCC cannot override configuration by RMSI/OSI, whereas it may override any configuration given by UE-specific configuration. In terms of SCell, configuration of SIB may be considered as UE-specific signaling as well. Or, in UE-specific configuration, at least for SCell SIB configuration, it may be indicated whether the configuration can be overridden or not or it may be determined whether the configuration is included in SIB or not.

(4) Option 4: GCCC cannot override semi-static resource including UE-specific configuration. Another alternative is to put higher priority on semi-static configuration.

(5) Option 5: Priority may be configured. Either for each configuration or general priority between semi-static configuration and dynamic PDCCH may be configured by higher layer along with GCCC enabling configuration. When priority is configured per each configuration, it may be explicitly indicated in each configuration (e.g. the configuration cannot be overridden by GCCC or can be overridden by GCCC). As a default, resources predefined in the specification, unless otherwise configured by higher layer later, may not be overridden by GCCC and semi-static configuration may be overridden by GCCC.

(6) Option 6: GCCC may always override semi-static configuration. In other words, GCCC may higher priority than semi-static configuration.

(7) Option 7: GCCC may override semi-static configuration in resources considered as flexible and cannot override semi-static configurations in resources considered as fixed DL or UL resources. The flexible resource may be determined by semi-static DL/UL configuration. If the semi-static DL/UL configuration is given by cell-specific configuration and/or UE-specific configuration and/or UE-group common configuration, the indicated fixed DL/UL resources may be considered as fixed DL or UL. Alternatively, the flexible resource may be determined by resources or RS types of semi-static configuration. For certain RS (e.g. tracking RS, beam management CSI-RS or SS block or physical random access channel (PRACH)), configuration may define fixed DL or fixed UL resources, and others may be considered as flexible resources. Alternatively, the flexible resource may be determined by configuration method. For example, resources which are configured semi-statically by broadcast messages such as RMSI or configured cell-specially may be considered as fixed DL or UL resources. For example, if beam management RS is defined by RMSI, or SS block or PRACH is defined by RMSI, the configured resources may be considered as fixed DL or UL resources.

If semi-static DL/UL configurations are given, and there are multiple configurations with different RS type and/or based on different configuration methods (i.e. multiple approaches described above are used jointly), it may be assumed that union of fixed DL/UL resources is used by semi-static DL/UL configuration and semi-static RS configuration, or it may be assumed that conflict does not occur. If conflict occurs, either the UE may treats the case as an error case, or the UE may follow semi-static DL/UL configuration.

For different options described above, it may need to be clarified that resources reserved for PBCH/PSS/SSS may include only actual resources intended for PBCH/PSS/SSS. For example, potential resources for PBCH/PSS/SSS may be reserved for N SS block and only a subset of N SS blocks may be used. In this case, unused SS blocks may be indicated to UEs so that it can be used for control/data/other transmission. As unused resources are unused somewhat in a deterministic manner, the unused resources may be indicated by higher layer (group-common or cell-specific or UE-specific) to UEs. In such a case, even with option 2, resource diction on such unused resource may be changed (i.e. unused resources may not be accounted for PBCH/PSS/SSS region).

Different priority between semi-static configuration and GCCC may be defined (e.g. default behavior or priority rule). For example, GCCC may override CSI-RS configuration, but GCCC cannot override grant free resources (at least some resources).

More specifically, there may be different resource type, i.e. DL/UL/flexible/reserved. Depending on the priority, different UE behavior may be considered.

Regarding relationship between GCCC & dynamic scheduling, the following priority may be considered.

(1) Option 1: Dynamic scheduling may always override GCCC.

(2) Option 2: Dynamic scheduling cannot override GCCC for UL resource. In other words, if GCCC indicates UL resources, dynamic scheduling cannot change the UL resources to DL resources. If that occurs, the UE may assume such resources are not used for DL (e.g. for measurement, data mapping, etc.).

(3) Option 3: Dynamic scheduling cannot override GCCC for DL resource. Similar to Option 2, it may not be possible to change resources indicated as DL by GCCC with dynamic scheduling.

(4) Option 4: Dynamic scheduling cannot override GCCC. That is, GCCC may always have higher priority than dynamic scheduling.

(5) Option 5: Priority may be configured. Similar to relationship between GCCC and semi-static configuration, the relationship between GCCC and dynamic scheduling may be configured per configuration or by higher layer.

Here, the dynamic scheduling may include DL data scheduling, UL grant, semi-persistent scheduling (SPS) activation/deactivation, any activation/deactivation messages. For each channel or type of dynamic scheduling, different behavior may be defined. For example, GCCC may higher priority than UL grant, but GCCC may have lower priority than DL scheduling.

When the common signal indicates reserved resource, reserved resource may be used for some purposes by additional signaling or dynamic DCI indication or configuration. For example, the reserved resource for eMBB UEs may be used for URLLC. For another example, the reserved resource may be used for sidelink operation. For another example, the reserved resource may be used for backhaul links. For sidelink, semi-static sidelink resource pools may be configured where actual sidelink resources are considered as available if semi-static sidelink resources are indicated as reserved resources or UL resources.

If multiple GCCC or different contents are adopted, priority may be configured or determined differently depending on the channel or the contents. For example, if common signal transmits slot type, option 3 described above may be applied. If common signal transmits information of control region size, the priority may be determined so that common signal may have higher priority than semi-static configuration and/or dynamic DCI. One example is that dynamic DCI may indicate starting position of OFDM symbol for data transmission, and common signal may indicate the end of control region where data is rate matched or punctured on the resource where the corresponding control channel is mapped to schedule data.

According to an embodiment of the present invention, signal transmission location in time/frequency is proposed. When GCCC is used, to handle UEs with different radio frequency (RF) bandwidth, separate GCCC may be configured per UEs with different RF bandwidth. In other words, different GCCCs may be configured to UEs with different RF bandwidths. Alternatively, GCCC may be transmitted within the smallest bandwidth so that all UEs can access GCCC. If multiple regions are monitored by UEs with small RF bandwidth, it may be still necessary to transmit multiple GCCCs in different frequency region. UEs supporting larger bandwidth may detect multiple GCCCS which may have the same contents. Alternatively, GCCC may be transmitted based on nominal RF bandwidth with aggregation level L. Aggregation level L/2 may be accessed by UEs with nominal BW/2, and aggregation level L/4 may be accessed by UEs with nominal BW/4. In other words, based on RF bandwidth, different aggregation level may be used. Alternatively, GCCC may be used only for UEs supporting at least M MHz. M may be prefixed or configured by the network. This may be indicated by the network via RNTI configuration to monitor GCCC. In other words, GCCC may be monitored based on the semi-statically configured RNTI value(s).

According to an embodiment of the present invention, control channel format is proposed. At least for slot type indication, smallest DCI, which may be transmitted over common search space or group-common search space, may be used. To minimize the latency of decoding so that common signal can be applied to the current slot, the set of candidates where common signal can be transmitted may be restricted to a subset of candidates or to the first OFDM symbols of the control region or to the frequency region among control resource set. To minimize the overhead, aggregation level 1 or 2 may be used for GCCC and further, small sized cyclic redundancy check (CRC) (e.g. 8 bits) may be used. Depending on the content, the restriction or the number of blind detections required to acquire common signal may be different.

If common or group common search space is shared between common signal and/or other control scheduling common data, and/or transmit power control (TPC) commands and/or fallback DCIs, hashing function of those DCIs may need to be adjusted depending on the aggregation level used for GCCC or depending on whether the resource for GCCC is reserved or not. For example, if aggregation level 1 is used for GCCC, hashing function for common or group common search space for DCI scheduling common data or fallback DCI or TPC commands may start at 2nd control channel element (CCE), instead of 1st CCE. Alternatively, to minimize the impact on other DCIs, GCCC may be transmitted in the last CCE or its blind decoding may be started from the end of CCE (e.g. the hashing function for GCCC may be configured as N where N is the number of CCEs in the common or group common search space). N may be changed per slot depending on the control resource set size or common or group common search space configuration. In other words, the mapping of GCCC may start from the end of CCE (in a reverse mapping). If aggregation level is larger than 1, the DCI may be mapped to CCE N−1 and CCE N and hashing function starts from N−1. If candidates are M with aggregation level L, the hashing function may start at N−M*L+1, where M candidates may be searched sequentially.

Overall, the idea is to map common control search space differently from other DCI, particularly if aggregation levels are different. If aggregation levels are the same, the same search space may be shared as well. Also different search space may be used if different DCI sizes are used between DCIs scheduling common data or TPC and GCCC. If the reserved resources are used, regardless of the presence of common data, the reserved resource may be rate matched for other control transmission. To minimize the blind decoding overhead, a set of aggregation level used for GCCC may be further restricted, i.e. different set of aggregation levels may be configured for GCCC and other DCIs. More generally, a set of aggregation levels may be configured differently per RNTI and/or per DCI format. Also different hashing function may also be considered per RNTI and/or per DCI format. Moreover, different control resource set and/or search space configuration may also be used per RNTI and/or per DCI format. Different control resource set may be used depending on the knowledge of UE from the network perspective. If contention-based PRACH is transmitted, SS for random access response (RAR) may be used which is shared among UEs using the same set of PRACH resources (or connected to the used PRACH resource). On the other hand, if contention-free PRACH is transmitted, UE-specific search space (USS) for the UE may be shared for RAR transmission as well.

According to an embodiment of the present invention, application of common signal is proposed. At least one of the following mechanisms may be applied.

(1) Common signal may be applied to UEs with configured RNTI for GCCC. In this case, common signal may not be applied to cell common data, such as paging, RAR, SIB, radio resource management (RRM), etc. In other words, GCCC may not be applied to UEs in non-RRC connected mode or only for unicast control/data. In other words, in terms of priority or handling of GCCC, semi-static configuration may always be prioritized for common data. For example, paging may always be expected in configured paging occasion, RAR may be transmitted in the resource based on semi-static resource configuration, PRACH may be transmitted in the allocated PRACH resources, PBCH may always be transmitted in the configured resources, and SIB may always be transmitted in the configured resource. Note that this is from UE perspective, and the network may not transmit data in the configured resource for some reason(s). At least one of the followings may be excluded from applying GCCC.

- PBCH transmission
- SIB transmission
- Paging transmission
- PRACH transmission
- RAR transmission (RAR window): For example, if common signal is also applicable to RAR, RAR window may be configured so that it counts only valid DL subframes/slots, thus, depending on the signaling, the actual duration may change.
- RRM measurement: This may also be applied to neighbor cells. A set of subframes usable for RRM measurement may be fixed which may be realized by fixed DL subframe/slots. The configured set of fixed DL subframe/slots may be always DL slots/subframes, unless it is explicitly reconfigured to be flexible subframe/slots. To support this, RRM resource indicated for a neighbor cell measurement may be considered as fixed DL resource. To support this, separate measurements may be exchanged via gNBs. A UE may not be required to monitor GCCC of neighbor cell to perform measurements.
- Radio link failure (RLF) measurement
- Tracking subframes: Similar to RRM, tracking RS transmission may also occur within the fixed DL subframe/slots.
- Synchronization signals transmission
- Fixed common search space: To combine with tracking RS transmission, a set of subframes may be fixed with common search space and shared RS transmission may be expected regardless of common data transmission. If such configuration is achieved, regardless of common control presence, those signals and behaviors may be maintained.
- Periodic CSI feedback measurement
- Periodic SRS transmission
- Periodic scheduling request (SR) resource
- Grant-free PUSCH resources (2) Common signal may be applied to all RRC_CONNECTED UEs. In this case, a UE may perform different behavior depending on the detection of GCCC. For example, RRM may not be performed in a slot/subframe which is indicated as UL only slot. This may be particularly beneficial if different RS is used for RRM measurement for RRC_CONNECTED UEs compared to RRC_IDLE UEs. In this case, depending on the contents of common signal, a UE may or may not perform RRM measurement. If sufficient aggregation of RRM measurement may not be achieved due to dynamic change of slot type, a similar handling to licensed assisted access (LAA) measurement may be used. That is, relaxed measurement may be performed or one-shot measurement may also be considered. The similar approach may also be applied to tracking/RLF measurement and if sufficient tracking RS or RLF measurement RS has not been transmitted, the network may transmit additional tracking RS/RLF measurement RS to support UE requirement.

(3) Common signal may be applicable to all UEs regardless of RRC state. It may be applied to RRC_IDLE UEs or RRC_INACTIVE UEs as well. Particularly in this case, the information about GCCC (frequency, time interval, time location, resource configuration, RNTI information, etc.) needs to be indicated by the common data such as PBCH or SIB, so that all UEs can access the information unless it is fixed in the specification. To support different UEs with different bandwidth which are anchored in different frequency regions within the system bandwidth, multiple copies of GCCC may be transmitted. As different UEs have different periodicity to wake-up, the information may be applied only within the slot or next slot or previous slot where common signal is transmitted. Or, if periodic transmission is used, multiple repetitions of transmissions within one interval may be supported.

(4) Some functionalities may be impacted by common signal regardless of RRC status, whereas some functionalities may not be impacted by common signal. For example, RS/synchronization signal transmission for RRM measurement for RRC_IDLE UEs may be transmitted without impacting by common signal, whereas RS for RRC_CONNECTED UEs' RRM measurement may be impacted by common signal or semi-static DL/UL configuration (UE-specific). For another example, PRACH based on contention may not be affected by common signal, whereas PRACH based on triggered and/or contention-free may be affected by common signal. In other words, the resources for PRACH for contention based may be indicated as UL resource by GCCC, whereas PRACH resource for contention-free may be overridden by GCCC. For another example, common search space transmission for RRC_IDLE, DRX UEs may not be affected by common signal, whereas common search transmission for active UEs may be affected by common signal. For another example, DRX timer may not be affected by common signal to minimize ambiguity or misalignment between the UE and the network.

Particularly, common signal may affect all UE-specifically configured resources, whereas it may not affect all cell-commonly or group-commonly configured resources. If this approach is used, grant free resource (if it is configured in a shared resource manner) may be fixed regardless of GCCC. One example of such configuration may include sidelink resource configuration or cell-commonly reserved resources. In other words, in terms of priority or determining resources availability, certain cell-common resource (which may be configured by SIB or cell-common signaling or prefixed) may have higher priority than dynamic common signal and/or UE-specific configuration. Another example of such configuration may include PRACH. As CSI-RS may be configured per UE-specific manner, it may be affected by GCCC.

(5) A subset of slots/subframes may be configured in which common signal may not be transmitted or common signal would may not be affected. For example, a set of fixed DL slot/subframes and fixed UL slot/subframes may be configured, and dynamically slot type may be indicated periodically or aperiodically. Even though the slot type may be applied during the periodicity between intervals where the signal is transmitted, the configured subframe/slots may be remained the same (i.e. is not affected by common signal). Another example, a set of subframes carrying common search space and the shared RS where shared RS may be present may be configured, regardless of the presence of the common search space.

(6) Fallback

When signaling is periodic transmission, if any signaling has not been received during the period, fallback may be done based on semi-statically configured cell-common or UE-specific configuration or group-common configuration. When signaling is aperiodic transmission, it may temporarily override the semi-statically configured configuration. Otherwise, semi-static configuration is may be applied. Alternatively, regardless of periodic, semi-static, a subset of slots/subframes may be assumed that common signal is not effective. This is for RRM, PRACH transmission, etc., of RRC_IDLE UEs.

According to an embodiment of the present invention, common signal indication in multi-beam case is proposed. For multi-beam case, at least the following aspects may be used with group-specific or cell-specific signaling. In multi-beam case, GCCC may be transmitted with potentially beam sweeping where each beam is transmitted in a subset of OFDM symbol(s) within a slot. For each beam, the set of OFDM symbol(s) may be configured and the set may indicate potential OFDM symbol(s) in which the configured beam based GCCC can be transmitted, or exact OFDM symbol(s) in which the configured beam based GCCC can be transmitted.

In terms of configuration, a UE may be configured with multiple control resource sets. Each control resource set may be mapped to one or more OFDM symbols where a UE expects to monitor the configured beam. In other words, multiple beams may be configured to the multiple resource sets. For each beam, the maximum or minimum size may be known or prefixed or semi-statically configured and a UE may expect to monitor multiple of this. One control resource set associated with a beam may be called beam-control resource set (BCRS). A UE may be configured with one or multiple of BCRS. In each BCRS, a UE may be configured with one or more OFDM symbols where the specific beam can be expected. Per each BCRS, the same beam or different beam may be assigned. For example, different TRP may be used for each BCRS where different beam is assigned. A UE may monitor those configured BCRS time/frequency resources for each set. To allow full flexibility in the network side, the network may configure very large time resources (e.g. one slot or maximum number of OFDM symbols where one symbol carries one beam control region). In this case, the UE blind decoding may be considerable.

To minimize the UE complexity, each OFDM symbol configured for BCRS may carry a signal. The signal may indicate at least one of the followings.

Beam identity (ID): According to whether the current symbol carries control signal for a given beam, the signal may be scrambled with the beam ID to indicate which beam is used in the current OFDM symbol. If the signal is not detected, a UE may stop decoding on the target OFDM symbol. Beam ID may be indicated via CSI-RS resource index and a UE may know quasi-co-location (QCL) relationship between CSI-RS resource and each transmission beam via configurations.

The presence of GCCC in the symbol: The signal may also be transmitted with the beam, and if the UE detects the beam, the UE may attempt to decode the symbol. In this case, the presence of GCCC or whether the symbol has been used for the GCCC transmission may be indicated.

Beam ID, and number of required blind detections: In addition to the beam ID, the number of blind detections per symbol may also be indicated.

{Beam ID, DL grant, DL data region part}, and/or {beam ID, UL grant, UL data region part} and/or {beam ID, associated time resource}: Another indication may be done to indicate which data part will be used for either DL or UL depending on the type. Data region part may be indicated from a pre-configured (via semi-static signaling) set of possible locations within a slot or over multi-slots covered by the current control signal. Common signal between DL and UL scheduling may also be considered. When time resource is indicated, further scheduling within that time resource may also be considered.

The following shows a few examples of common signal in multi-beam cases. Single beam indication may be done per beam for the multi-beam case, without loss of generality.

(1) Case 1: Indicate which OFDM symbol(s) to read for control channel

Beam index for the next few set of OFDM symbol(s) may be indicated in each OFDM symbol. The frequency of signaling may be either every one OFDM symbol or every a few OFDM symbols depending on the size of BCRS.

(2) Case 2: Indicate search space blind detection candidates in each OFDM symbol(s)

The number of candidates where a UE is supposed to perform blind detection may be indicated in each OFDM symbol. Regardless of beam index, a UE may search the candidates or it may be combined with beam index. In terms of signaling, it may be either actual number or ratio of search space or the number of candidates compared to the default/configured values.

(3) Case 3: Indicate DL portion or UL portion associated with control channel

When beam index is indicated in the signal, it may also indicate the associated DL portion or UL portion within a slot or across multiple slots. Whether the signal is done per slot or per multi-slots may be configured by higher layer or indicated dynamically in the signaling. The indication may indicate one among pre-configured patterns or sets. Also, the indication may just configure the starting/ending of each region. Data region may exist without any associated control region. In this sense, it is also possible that instead of signaling associated DL or UL portion with the control beam, the indication may simply indicate DL portion or UL portion within a slot or within multi-slots. Two information may also be indicated independently. By knowing this information, the followings may be applied.

CSI-RS transmission: CSI-RS position may be fixed relative to the end of DL portion. If DL portion changes due to some reasons, e.g. reserved resource or UL resource, the actual position of CSI-RS may be changed. Alternatively, CSI-RS may not be transmitted within a unit (slot or multi-slot depending on the configuration) if DL portion size is smaller or it does not cover CSI-RS position.

SRS transmission: Similar to CSI-RS, SRS may be fixed relative to the start of UL or end of UL portion. Or, UL portion size may determine whether to transmit SRS or not.

Any periodic RS: If tracking RS is adopted, similar to CSI-RS, different approaches may be considered.

In terms of duration, it may be determined implicitly based on the OFDM symbol index in which control is carried. For example, the DL or UL portion per beam may be virtually divided based on the maximum number of beams per slot/multi-slot, and the index of control channel in terms of OFDM symbol may be used for the index for the DL or UL portion within slot/multi-slot.

(4) Case 4: Indicate beam index used in control channel

Simply, beam index used for the OFDM symbol(s) may also be indicated.

(5) Case 5: Activate or deactivate any semi-statically configured information

Another approach is to allow opportunistic signal which may activate or deactivate the semi-statically configured information. The activation or deactivation may be applied only to the slot/multi-slot where the signal is applied or the effectiveness can continue. In case of the latter, the reliability may become an issue which requires repeated signaling. In this sense, when opportunistic signaling is used, it may be restricted only to the slot/multi-slot (i.e. temporary activation/deactivation). For example, temporary deactivation may also be transmitted, and a UE may expect that periodically configured CSI-RS or SRS transmission may occur if the deactivation signal is not detected (or temporary activation may also be considered). This is to support temporary resource blanking due to some coordination or handling forward compatible resources, etc. Similarly, for semi-statically configured OFDM symbols for a beam index for control channel monitoring, if any signal to deactivate the symbol is detected, a UE may skip decoding on the symbol.

(6) Case 6: DL/UL pattern within a slot/multi-slot

Which DL/UL pattern is used within a slot or multi-slot may be indicated. For example, if one slot or multi-slot is divided to four small mini-slots, DL/UL configuration (e.g. 2:2) may be indicated by common signal per each beam.

Figure 5:
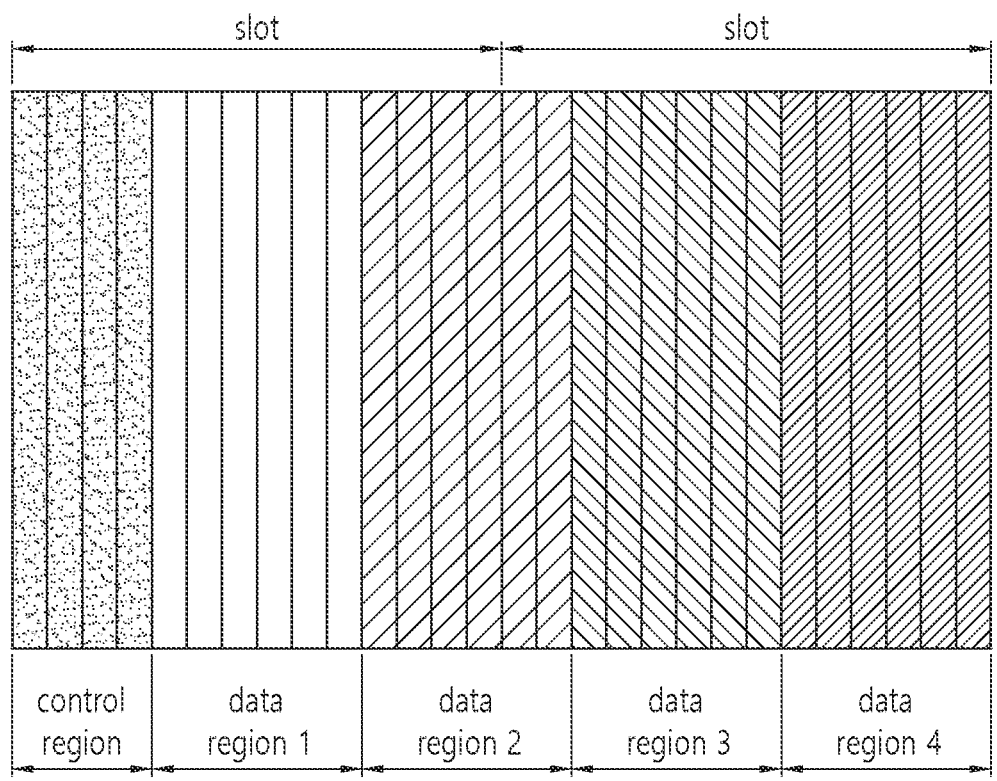
FIG. 5 shows an example of indicating which DL/UL pattern by common signal according to an embodiment of the present invention.

FIG. 5 shows an example of indicating which DL/UL pattern by common signal according to an embodiment of the present invention. In FIG. 5, a UE is configured with a set of BCRS. In each BCRS, at least one of a beam index, frequency/duration location of SS, a number of candidates or related hashing function may be indicated. Further, in FIG. 5, two slots are divided to control region and four small mini-slots. In this case, DL/UL pattern (or, configuration) may be indicated.

The beam index discovered/used during beam management/initialization may be used for control channel.

When beam index is signaled, a channel/signal may carry more than one beam indices as the signal can be targeted for more than one beam. For example, for UEs without DL/UL scheduling, control channel monitoring may not be necessary. However, some indication (e.g. activation/deactivation) may be useful. To support this, beam indices may be grouped and the signal may be transmitted per beam group instead of per beam. Indication of activation/deactivation or other common channel/signal may be transmitted in addition to this signal. For example, the first signal may indicate whether there will be some control channel/signals in the current OFDM symbol. This may be done by transmitting beam group or beam ID in each OFDM symbol (based on the unit size where the signal is transmitted, in each OFDM symbol or every a few OFDM symbols). Once it is detected, additional control may include necessary additional information (e.g. activation/deactivation) per beam.

Single beam case may be treated as a special case of multiple beam case with one beam. In other words, all mechanisms applicable for multiple beam case may also be applicable to single beam case.

According to an embodiment of the present invention, common signal indication in single beam case is proposed. Similar purpose of common signal to multi-beam case may be considered for single beam case. In multi-beam case, beam index may be used as a group index. In single beam case, separate group ID, which may be divided per subband or per UE groups depending on usage scenarios, etc., may be defined. Further grouping within a beam or beam grouping in multi-beam may also be considered.

Applying to both single beam case and multi-beam case, one motivation to adopt common signal is to indicate resource allocation type and/or granularity.

According to an embodiment of the present invention, the relationship among beams is proposed. In the present invention, it was mentioned that beam index may indicate whether the UE is supposed to read control channel or to indicate some possible DL or UL region associated with the beam index. However, actual information to indicate beam index may be different depending on various operation. The followings may be a few examples to indicate beam index.

Alternatively, in multi-beam case, the resources may be defined for GCCC with beam index(s) that a UE is configured to monitor. Otherwise, the resources may be considered as flexible resources unless the UE is scheduled. In that sense, some semi-static configuration may not be valid in flexible resources if they are configured to do so.

CSI-RS resource index: If a UE is configured with multiple CSI-RS resources and data transmission occurs associated with one or more CSI-RS resources, similarly, CSI-RS resource may be associated with control channel. In other words, a UE may be configured with one or more CSI-RS resource indices which are monitored by the UE. Different CSI-RS resource may be configured with different characteristics such as TRP identity, different blank resource set (semi-statically configured), control resource set configuration (time-domain only or frequency-domain only or both time/frequency domain). For common search space, default CSI-RS configurations/resource indices may be used, or no explicit configuration may be used.

Beam index from measurement RS: Beam index used in measurement RS may be used as beam index of control channel. The measurement RS may be either based on reference signal or synchronization signals.

Beam index from OFDM symbol where the corresponding beam precoded measurement RS is transmitted: Symbol index or SS-block index in which synchronization and/or measurement RS has been transmitted with the corresponding beam may be used as beam index of control channel.

More specifically, the following may be some procedure to acquire beam index for control channel monitoring, and its associated feedback.

(1) Multiple SS-blocks may be transmitted and each SS-block may contain a single beam. Based on initial cell search and measurement based on signals transmitted in each SS-block, a UE may determine best transmission (TX) beam(s) and the corresponding reception (RX) beam(s) for each best TX beam. The beam index may be inferred from the location of SS-block, index of SS-block, or separately indicated by each SS-block. In this case, a UE may assume that the selected best TX beam may also be used for control channel monitoring. For common search space, a UE may be expected to monitor control channel in given TX/RX beam pair(s) which are discovered during initial access. The beam pair for each common search space for initial access may be configured as follows.

RAR: Reciprocity may be assumed or not. When reciprocity is assumed, corresponding RX beam based on TX beam may be used for PRACH transmission, and the TX beam selected for PRACH transmission may be used for RAR reception. For RX beam to receive TX beam, the best RX beam selected by the UE in the initial access procedure or synchronization signal detection procedure, or already known RX beam may be used for the given TX beam.

Msg 3: TX beam of a UE may be explicitly indicated by RAR or a UE may select the best beam similar to beam selection for PRACH. The RX beam to receive Msg 3 may also be determined based on PRACH/RAR procedure. The UCI transmitted with Msg 3 may be transmitted with the same beam direction or may follow PRACH beam direction. If the beam index for Msg 3 is explicitly indicated and UCI and PUSCH transmission occur independently, the beam used for PUSCH and UCI transmission may be different, and UCI may be transmitted to the same beam index where PRACH has been transmitted. If PRACH has been transmitted with multiple beams, UCI may be transmitted only with the best beam.

Msg 4: Without any further configuration, the same beam index may be used between RAR and Msg 4. With HARQ-ACK feedback on Msg 4, Msg 3 may carry CSI feedback which may be used to further refine the beam for each UE. Thus, the beam index used for the UE may be further reconfigured after or during Msg 4.

(2) SS block index may be defined, and SS block index may indicate the associated RAR/Msg4 timing TX/RX beam pair implicitly without any further association. Prefixed timing relationship between PRACH TX beam and RAR TX beam may exist so that a UE can expect to receive RAR TX beam in a certain position without further configuration. Similarly, beam used for PRACH/Msg 2 may be used for Msg 3/4. For Msg 4 search space, fixed timing between Msg 3 to Msg 4 may be used. Thus, a UE may not need to monitor multiple search spaces. Or, common signal mentioned in the present invention may be used to indicate beam index used in each SS so that a UE can skip decoding if the beam index is not matched to the corresponding beam.

(3) The same beam used for PBCH reception or the beam associated with PRACH (i.e. TX beam from gNB corresponding to PRACH TX beam from UE) may also be used for control channel reception at least for common control data. For PBCH, if it is different from synchronization signal, it may be indicated by the UE. This value may be used as a default value until reconfiguration occurs.

Figure 6:
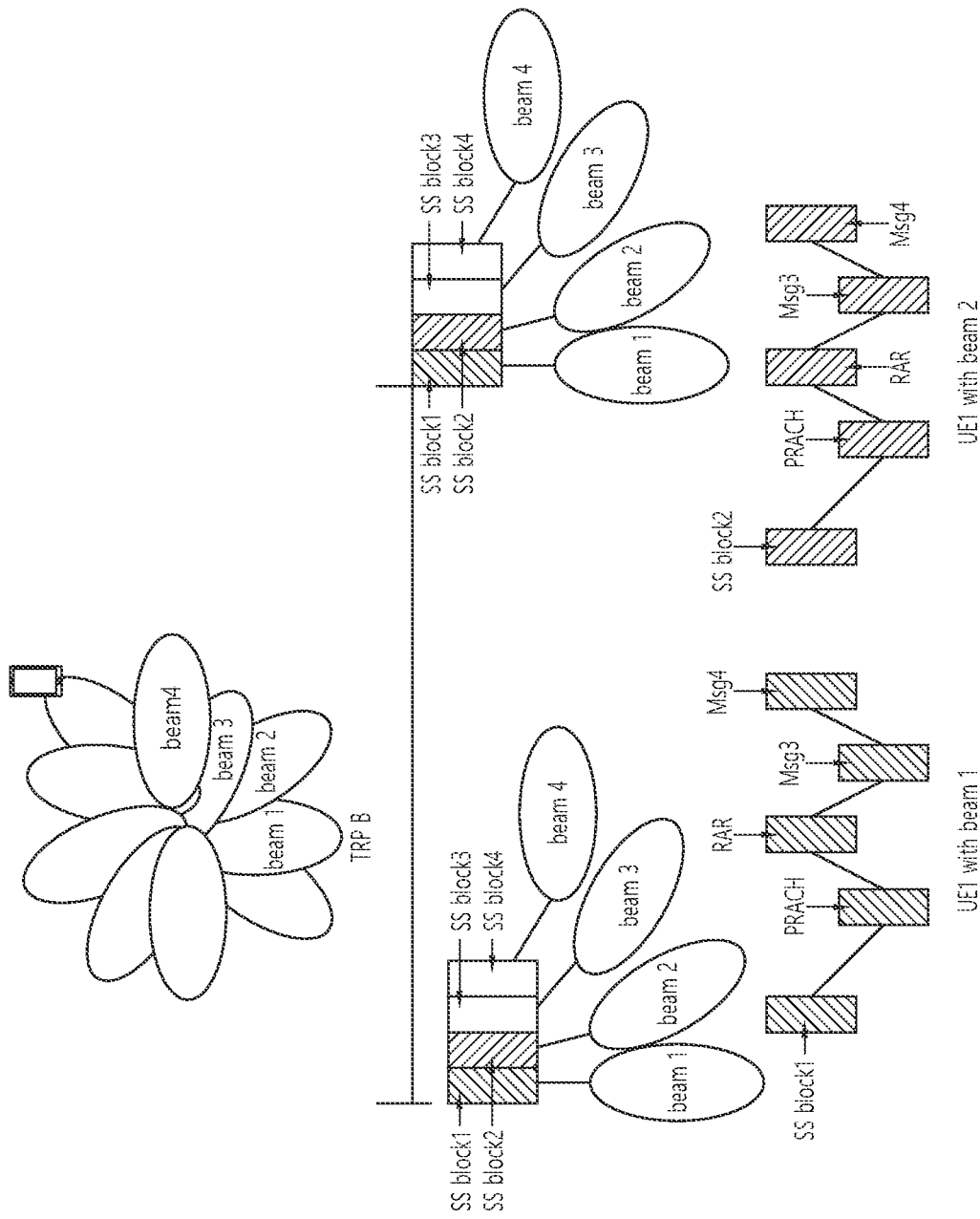
FIG. 6 shows an example of a procedure acquiring a beam index according to an embodiment of the present invention.

FIG. 6 shows an example of a procedure acquiring a beam index according to an embodiment of the present invention. When reconfiguration is occurred for the USS, or group search space, in each search space, associated beam index (or CSI-RS resource index) may be indicated. A UE, by configuring one or multiple of search space or resource set, may monitor one or multiple beam. For each beam index (or CSI-RS resource index), The UE may know the best RX beam via beam management. In terms of search space or resource set configuration, a UE may be configured with time-resource or time-resource which is the maximum control resource set in time.

More specifically, beam index or beam used for control transmission may consist of subset of CSI-RS resource. For example, 1 or 2 ports of CSI-RS may be used for control transmission, or a certain precoding may be used. In either case, the number of ports may also be configured per each control resource set. This may be useful when spatial multiplexing is applied among different control channels. When beam index or related information is not configured, a UE may assume that beam index discovered during initial access procedure may also be used for control channel or single beam is used in the network.

Hereinafter, various aspects of GCCC are proposed according to embodiments of the present invention.

1. Physical Channel Used for GCCC

When GCCC is transmitted and/or received opportunistically, it may not be desirable to prefix the resources for GCCC. As control channel decoding may occur after detection of GCCC, if GCCC is transmitted in predefined resource, GCCC may puncture control channel. Or, the presence of GCCC may be implicitly determined by detection of GCCC, and depending on the presence of GCCC, the mapping of control channel may be different, i.e. control channel may be rate matched or resource element group (REG) mapping may be changed.

Alternatively, GCCC may be transmitted via group search space or cell common search space or UE-search space. In that case, aggregation level(s) for GCCC may be configured via higher layer or broadcast configuration (e.g. SIB). This may be particularly useful if the size of GCCC contents is quite different from other DCI sizes (and thus increase the number of blind detections). Furthermore, when reliability requirement between regular DCI and GCCC is different, different aggregation level seems necessary. Lastly, it may also be useful when GCCC is mapped to the partial OFDM symbols in the control region of SS where GCCC may be transmitted. If multiple OFDM symbols are configured to SS where GCCC is also transmitted, the mapping of GCCC may be restricted to the first one or two OFDM symbols to reduce the latency. In this case, the following mechanisms can be considered.

Regardless of control region size of SS where GCCC can be transmitted, GCCC may always be mapped to one or two symbols only. In other words, in case of GCCC mapping, except for one or two symbols, control channel may be rate matched in other OFDM symbols. As it may reduce the available resources in which GCCC is mapped, increased aggregation levels may be used. The aggregation level may also be increased automatically. For example, if control region spans two OFDM symbols whereas GCCC is mapped to one OFDM symbol, and REGs in a CCE are rather uniformly distributed within control region, aggregation level for GCCC may be doubled to compensate resources mapped in second OFDM symbol. This may also be addressed by explicit higher layer configuration of aggregation levels used for GCCC. Alternatively, when GCCC is configured, the number of OFDM symbols where GCCC can be mapped may be configured by higher layer. Depending on the information, the aggregation levels may be automatically defined. If the number of OFDM symbols where GCCC can be mapped to is the same as control region size, the same set of aggregation levels configured in SS may be used for GCCC as well. Or, the same set of aggregation levels for group common search space may be used for GCCC. If smaller number of OFDM symbols are used compared to the search space, aggregation levels may be doubled, and extra aggregation level may be monitored.

Separate resource set may be configured for GCCC

Different REG-CCE mapping (restricted to one or two OFDM symbols) may be considered.

2. Handling Carrier Aggregation (CA) Environments

In NR, different CA environments may be considered as follows.

(1) DL and UL may be configured from different frequency band. From carrier frequency band perspective, though a UE is served via only one carrier, DL and UL may be treated as if they are carrier-aggregated.

(2) Multiple carriers may be aggregated to support wideband operation (3) Inter-frequency band or intra-frequency band CA may be considered.

When CA is used, transmission of GCCC becomes a bit more challenging, particularly when a UE does not monitor common or group common search space in secondary cell (SCell). Particularly, when different carrier is configured for DL and UL separately, as different UEs may be configured with different UL carrier though they share the same DL, the common signal needs to be clarified. The following mechanisms may be considered for CA environments.

(1) When group common search space or GCCC is transmitted, separate GCCC may be transmitted per DL/UL pair. Different DL/UL frequency band may be configured. However, this may lead excessive overhead if UEs are configured with different DL/UL frequency bands.

(2) Common signal may be transmitted separately for DL carrier and UL carrier. For DL carrier, same-carrier scheduling/transmission may be used, whereas for UL carrier, cross-carrier scheduling/transmission may be used.

(3) Common signal may be transmitted only for self-carrier so that any common signal is not supported for the cases of cross-carrier scheduling or different DL/UL carrier combination. This may also include FDD case. For FDD case, the paired DL and UL may be the same carrier from GCCC scheduling/transmission perspective. In this case, even though a UE is scheduled with cross-carrier scheduling, for common signal, the UE can monitor group common search space in self-carrier. Further in this case, if UL is in different frequency band, unless the pairing is specified as a cell-common pairing by broadcast signaling e.g. via PBCH/SIB, any signaling on UL carrier may not be supported. If different frequency band paring between DL and UL is achieved via cell-common broadcast, the signaling may be interpreted for the paired UL as well. UEs configured with different UL carrier from cell-common paired DL-UL may ignore configurations related to UL.

(4) Common signal may be transmitted either via self-carrier scheduling or cross-carrier scheduling. Separate or combined indication for multiple carriers may be possible. If GCCC is configured only in a subset of carriers among configured aggregated carriers, the signaling may include information for multiple carriers.

Particularly for intra-band CA, the same configuration applies to the all carriers in the same frequency band if a UE is indicated that the configuration may be the same. In other words, if the network configures the same configuration among intra-band carriers, the network may inform UEs about it, and the UE may assume the same configuration. This may be done by mapping configuration of multiple carriers to the same entry of slot formation indication (SFI) when multiple SFIs are given by GCCC. Otherwise, a UE may not assume the same configuration. Particularly, fixed DL subframes/slots may be different per carrier even in case of intra-band CA.

More specifically, if a UE is configured with multiple UE-specific carriers on a carrier from the network perspective, a UE may monitor GCCC in one UE-specific carrier (or subset UE-specific subcarriers) of configured UE-specific carriers. The UE may assume that the same configuration applies to other UE-specific carriers. Even when a UE monitors GCCC on multiple UE-specific carriers within a carrier, the same configuration may be used unless some advanced feature (such as full duplex or FDM between DL/UL is supported) is used or unless otherwise indicated. In this case, even though a UE may be configured with multiple DL UE-specific carrier, the UE may be only configured with one UL UE-specific carrier. For not-configured UL UE-specific carriers, information carried over GCC may be ignored. If a UE is configured in a DL UE-specific carrier and corresponding UL UE-specific carrier is not configured, the information from GCCC regarding UL may be applied to the configured UL UE-specific carrier. If different configuration is applied in each UE-specific carrier, the UE may assume that network can configure proper UE-specific carrier for GCCC monitoring. The UE-specific carrier where GCCC is monitored may be configured by higher layer to a UE or group of UEs, particularly when a UE is configured with multiple UE-specific carriers within a NR-carrier. This may be done by configuring mapping between SFI in GCCC (such as one entry in multiple entries in the channel) and one or more carrier indices configured to a UE. In other words, this mapping may be UE-specific. If mapping is not given, a UE may assume that self-carrier with the associated DL/UL in unpaired spectrum is mapped.

Furthermore, a UE may be configured with multiple carrier groups for GCCC. In each carrier group, the same configuration may be assumed, including slot type indication from GCCC and/or fallback configuration. When carrier groups are configured, which carrier is used for transmission of GCCC may also be configured. In other words, representative carrier to transmit GCCC may be additionally indicated per carrier group.

(5) When GCCC transmission is not available due to cross-carrier scheduling configuration or different UL frequency band configuration, etc., the UE may assume that semi-static configuration may always be applied and possibly assisted by UE-specific dynamic signaling. If that is not available, the carrier (UL carrier only or DL carrier only or DL/UL carrier) may not be configured with GCCC, and the resources may be flexible.

(6) Common signal at least for slot type indication may be transmitted only for TDD carriers. If flexible duplex operation is achieved in FDD UL spectrum, common signal for UL where TDD operation is achieved may be transmitted. Other common signal may be transmitted for DL or UL or both DL/UL depending on the contents. For example, in case of puncturing indication, it may be more desirable to indicate only for DL, and the size of control region may also be indicated only for DL.

When supplemental UL (SUL) carrier is configured for a DL/UL carrier, GCCC may be separately transmitted between DL/UL carrier and SUL carrier. When different numerology is used between DL/UL carrier and SUL carrier, the followings may be considered for SFI for SUL carrier.

Slot format may be based on DL carrier where SFI is transmitted. Accordingly, slot type for SUL carrier may be determined (e.g. if 2 OFDM symbols of 15 kHz subcarrier spacing in DL is used, 4 OFDM symbols of 30 kHz subcarrier spacing in SUL carrier in DL is used).

Slot format may be based on SUL carrier which may be configured to the UE. In terms of interpreting slot format for SUL, numerology of SUL carrier may be considered.

Similar handling may also be assumed when DL and UL use different numerologies. In other words, when DL and UL uses different numerologies, separate SFI may be transmitted to DL and UL respectively, even in unpaired spectrum case.

Overall, for DL, GCCC may be applied to the DL carrier if self-carrier transmission is used, and/or the same carrier in which GCCC is transmitted if cross-carrier scheduling is used (for GCCC itself), and/or the indicated DL carrier by cross-carrier scheduling, and/or all DL UE-specific subcarriers within a NR carrier, and/or all DL carriers in contiguous intra-band carriers. For UL, GCCC may be applied to UL carrier if self-carrier transmission is used, and/or the paired UL carrier by cell-common signaling and/or by specification with DL carrier in which GCCC is transmitted, and/or all UL UE-specific subcarriers within a NR carrier, and/or all UL carriers in contiguous intra-band carriers. For cross-carrier scheduling, separate carrier index may be used for DL and UL, and thus cross-carrier for UL may also be possible independently from DL carrier. Or, the paired UL carrier for the DL cross-carrier scheduled carrier may be used. If latter is used, carrier index may be used for DL-UL paired carrier or DL only carrier. In case of TDD on the same frequency band, the same frequency may be paired in the same frequency. If cross-carrier scheduling of GCCC is adopted, and different numerology is used between scheduling and scheduled carrier, the scheduling may be done in the first slot, where slot boundary between carriers are aligned only. Or, if scheduling occurs in the middle of slots corresponding to one slot with smaller subcarrier spacing, the configuration may be applied in the next slot.

According to an embodiment of the present invention, handling CA and cross-carrier scheduling case is proposed. When slot type indication is considered which involves both DL and UL, some clarification may be necessary, particularly if different UEs are configured with different UL carrier while sharing the same DL carrier. For example, as discussed in LTE-NR coexistence, LTE UL spectrum for NR UL transmission may be utilized to achieve better coverage. In that case, instead of utilizing paired UL spectrum or the same spectrum to DL spectrum, a UE may utilize different UL spectrum. In such a case, whether a UE can assume the indicated slot type also to UL spectrum or not needs to be clarified. Furthermore, when a UE is configured with cross-carrier scheduling for a carrier, whether GCCC can be transmitted from the same carrier or scheduling carrier needs further discussion.

3. Fallback Behavior

When slot type is indicated via common signal, fallback operation needs to be clarified. As slot type may include different length of DL, UL, reserved portions, fallback configuration needs to be carefully considered, particularly for UL transmission. The following mechanisms may be considered.

(1) Dynamic signaling may indicate larger DL portion, and may indicate the same UL portion compared to fallback configuration. For DL, a UE without detecting the common signal may miss RS transmission on the increased DL portion by dynamic signaling. If a UE is configured with aperiodic CSI-RS reporting, a UE may assume that CSI-RS is transmitted even though it misses the dynamic common signaling, and fallback configuration may indicate no potential measurement RS transmission in the slot.

(2) Dynamic signaling may indicate smaller DL portion, and may indicate the larger UL portion compared to fallback configuration. For DL, a UE without detecting common signal may assume that RS transmission may occur in the slot. As the network has not transmitted RS in the slot, it may affect measurement performance of the UE. Particularly for RS used for aggregated measurement such as RRM, periodic CSI-RS, RS transmission may occur in the fixed DL portion and fixed DL portion may not be changed by the dynamic signaling. In other words, there may be some overlapped portion for DL between fallback configuration and dynamic signaling so that a UE may assume that the UE wrongly detects common signal if the common signal indicating fixed DL portions are changed to either UL or reserved.

For UL, a UE may assume that a long PUCCH format may be transmitted if common signal has been received. Otherwise, the UE may assume that a short PUCCH format may be transmitted. If PUCCH format is dynamically selected depending on slot type, some further considerations may be necessary. For example, long PUCCH format may be designed so that it may be rate matched around short PUCCH resources. Alternatively, to address missing case, long PUCCH format may be triggered only if UL only or UL heavy slot type are semi-statically configured, which may not be changed by the dynamic signaling or by dynamic indication in the scheduling (in other words, DL scheduling DCI may also include PUCCH format between long and short). If long PUCCH resources are reserved, a set of subframes/slots may be UL-centric/heavy or UL slots. In terms of dynamic signaling indication, such resources/slots may always be indicated as UL centric or UL slot. However, the network may change the slot to DL-centric or DL-heavy as there are no expected PUCCH transmission. Thus, for UL, it may not be so essential to assume that a subset of subframes are fixed to UL-centric or UL slot. Regardless of configurations, a UE may assume that a slot type is UL-heavy or UL if long PUCCH is configured to be transmitted. As different size of long PUCCH format may be used in different length of UL portion, when long PUCCH format is configured, the size of long PUCCH format may be configured. Alternatively, when DL transmission occurs, the exact length or format of long PUCCH may also be indicated, and the network may configure a set of PUCCH formats including long PUCCH formats and indicate dynamically the exact format. If multiple ACK/NACKs are transmitted on the same format, the same format may be indicated in each DL transmission.

(3) Dynamic signaling may indicate all DL, whereas fallback configuration may include UL portion. It is possible that a UE scheduled with periodic SRS, etc., may transmit in the slot if it misses common signal.

(4) Dynamic signaling may indicate all UL, whereas fallback configuration may include DL and UL portions. It is possible that a UE expects some DL measurement RS transmission in the slot if it misses common signal and measurement RS is configured to be transmitted in the slot.

(5) Dynamic signaling may indicate reserved resource, whereas fallback configuration may include DL and UL portions. It is possible that a UE expects some DL measurement RS transmission in the slot and/or a UE may also transmit any scheduled UL transmission such as SRS if it misses common signal and measurement RS is configured to be transmitted in the slot.

In terms of making fallback configuration, the following approaches may be considered.

(1) Semi-static DL/UL configuration (e.g. LTE TDD DL/UL configurations with special subframe configuration) may be used. If common signal is missing, the slot may be considered as either DL or UL or special subframe. In this case, reserved resource may be protected only by scheduling.

(2) DL slot may be assigned as slot which requires fallback configuration due to common signal missing. In this case, a UE may assume DL measurement even though the network may not transmit any DL transmission. This may lead inaccurate measurement performance. In this sense, if this approach is used, it is highly desirable that measurement is transmitted in fixed DL portions which may not be altered by common signal. To minimize the case of mis-computation of measurement, it is also possible that only minimum DL portion may be able to schedule DL. Data may be scheduled where a UE may further assume more DL resources available by the scheduling. To minimize the case of non-transmission of UCI, it may also be possible that minimum UL portion is also assumed where if a UE is scheduled ACK/NACK in the slot, it may transmit ACK/NACK.

(3) UL slot may be assigned as slot which requires fallback configuration due to common signal missing. If a UE behaves differently in UL slot compared to UL-centric or DL-centric (e.g., use different PUCCH length, PRACH format, etc.), it may be necessary to design PUCCH/PRACH used in UL slot not to interfere with PUCCH/PRACH transmission in UL-centric/DL-centric. For example, separate resources for PUCCH/PRACH transmission may be configured depending on the length/format.

(4) Reserved slot may be assigned as slot which requires fallback configuration due to common signal missing.

(5) Semi-static DL/UL configuration or DL/UL slot type may be configured to a subset of slots and fallback may occur following the semi-static configuration. In other slots/subframes, one of option (2), (3) or (4) mentioned above may be used.

(6) Semi-static DL/UL slot type configurations may be used. Similar to DL/UL configuration, a set of slot type for each slot over multiple slots may also be configured semi-statically.

More specifically, when a UE is configured with long PUCCH format in a carrier and slot type may be dynamically changed, the following mechanisms may be considered.

(1) A UE may transmit long PUCCH format in a slot based on PUCCH timing configuration regardless of common signal indication and/or semi-static configuration. In other words, if the UE is indicated to transmit long PUCCH format, regardless of common signal/fallback operation, the UE may transmit long PUCCH format in a given slot.

(2) A UE may transmit long PUCCH format only in a slot which are indicated as UL-centric or UL slot by dynamic signaling (or by fallback operation if dynamic signaling is missing). Otherwise, a UE may switch to short PUCCH format or skip PUCCH transmission.

(3) A UE may transmit long PUCCH format only in configured subset of slots which are configured that they can carry UL centric channels such as long PUCCH format. In other slots, regardless of slot type, a UE may transmit short PUCCH format. Alternatively, a UE may be configured with a subset of slots/subframes in which long PUCCH format may be transmitted (and/or short PUCCH may be transmitted).

(4) Fallback configuration may be always be followed for long PUCCH format. For dynamically changed UL-centric slots, long PUCCH format may not be allowed (i.e. short PUCCH format is rather used).

(5) Different size of long PUCCH format may be used following fallback configuration. The maximum UL portion granted by fallback configuration may be used for PUCCH transmission in each slot. If more UL portion is granted by GCCC, the extra UL portions may be used for non-PUCCH transmissions (e.g. aperiodic SRS, PUSCH, etc.). This is particularly applied if PUCCH length is semi-statically configured or PUCCH length is not dynamically changeable. This may be true even if fallback configuration is not given for DL/UL slot type in general. Alternatively, PUCCH length in each slot may be semi-statically configured. A set of slots used for long PUCCH format with a certain length may be configured and multiple sets of such list may be configured to a UE or group of UEs or cell-specifically.

(6) PUCCH length may be dynamically indicated by DL scheduling DCI, and the UE may always follow length indicated by DL scheduling. GCCC may indicate smaller or larger UL portion which may be lower priority compared to dynamic indication. In other words, a UE may not expect that PUCCH resources are indicated dynamically in a resource which is indicated as either DL resource or unknown resource by GCCC. Similar to dynamic DCI, this may always be assumed that the same information by dynamic signaling are used. Semi-static resources, such as SR, CSI feedback, or HARQ-ACK for SPS corresponding (if any), may be overridden by dynamic GCCC. In that case, if length of the semi-statically configured PUCCH resource is larger than the indicated UL resource by GCCC, it may be considered as invalid resource. Or, multiple PUCCH formats may be configured and one format which has the largest length fitted within the indicated UL resource may be selected.

Alternatively, fallback option may be different depending on how the indication is utilized. If GCCC is for neighbor cell's interference handling, a UE may use DL slot for fallback option when GCCC is missing.

Fallback example is as follows. Unless the signaling is purely additional signaling, some fallback behavior needs to be defined to handle GCCC missing case. One example of fallback operation is to use semi-statically configured slot types, which are applied/assumed if GCCC is missing. Furthermore, if slot type indication changes the duration of UL portions, it needs to be clarified how PUCCH is transmitted. One approach is to assume that fallback configuration is always subset of dynamically indicatable UL portions (unless it is configured as DL only subframe) so that a UE may transmit PUCCH on the resource following fallback configuration. If this approach is used, regardless of UL portions configured by GCCC, limited UL resources may available for PUCCH transmission.

Figure 7:
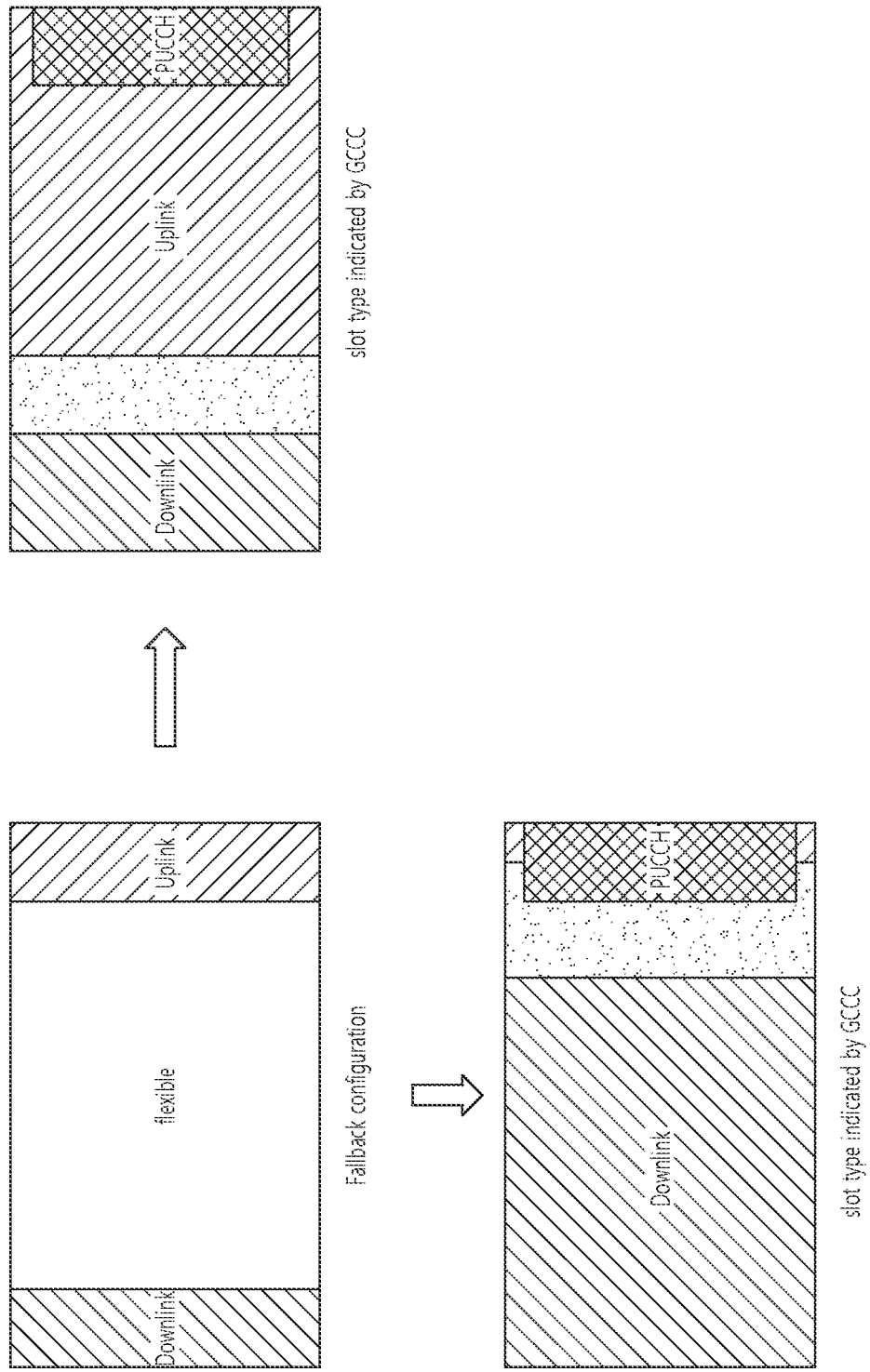
FIG. 7 shows an example of fallback operation according to an embodiment of the present invention.

FIG. 7 shows an example of fallback operation according to an embodiment of the present invention. Referring to FIG. 7, regardless of GCCC indication on slot type, PUCCH region may be unchanged to avoid any ambiguity between the network and UEs. Also, it may be desirable that dynamic PDCCH does not indicate any UL portion smaller than PUCCH regions.

For the fallback configuration, smallest DL and smallest DUL portion may be configured and other portions may be left as flexible so that flexible resources may be indicated by the network for data & other scheduling. If this is used, for DL measurement, measurement RS may need to be transmitted in the smallest DL to avoid any ambiguity. Different slot may have different fallback slot type, and smallest DL and smallest UL may be used for a slot with DL and UL. In flexible resource, resources indicated dynamically may be valid, and some semi-static configuration may also be considered as valid (or depending on configuration, the default behavior may also be configured whether to assume valid or invalid) under the fallback condition.

4. Resource Configuration for Common Signal

Assuming periodic or aperiodic transmission of GCCC, GCCC may be transmitted via common search space or group common search space. Aggregation level used for GCCC may be further restricted to the maximum aggregation level considering the reliability. In a wideband system, there may be multiple duplicate common search space and different UEs may monitor different common search space due to its limited bandwidth or bandwidth adaptation operation, etc. A UE which may monitor multiple common search space or resources simultaneously may acquire multiple copies of GCCC or may be configured to monitor only one common search space. If a UE may acquire multiple copies, the content needs to be same across different subbands in the wideband. As different subband may be equipped with different slot structure and/or numerology and/or resource allocation in DL, UL, guard period, and/or reserved resource, the relationship between GCCC and its effective bandwidth needs to be clarified. The following approaches may be considered.

(1) The wideband may be divided to a few subbands and each subband may have independent cell-specific search space (CSS). GCCC may be carried in each subband. GCCC may be applied to resources in the corresponding subband only.

(2) There may be multiple resource sets for CSS and a UE may be configured with one resource set for CSS for GCCC. Along with the resource set configuration of CSS, the resource region where GCCC is effective may also be configured. Unless otherwise indicated, GCCC may be applied to the entire system bandwidth.

In either approach, a UE needs to be configured with search space in which GCCC can be monitored and the resource in which GCCC is applied, implicitly or explicitly.

Another issue is whether a UE is required to monitor common search space or group common search space for GCCC in every subframe, regardless of whether a UE is configured with a subset of slots for control monitoring. The following approaches may be considered.

(1) A UE may monitor GCCC only in slots in which CSS/group search space (GSS) is configured to be monitored.

(2) A UE may monitor GCCC separately from CSS/GSS. In other words, if a UE needs to monitor GCCC in every slot, regardless of control resource set or search space configuration, the UE may monitor CSS/GSS in every subframe or configured resources for monitoring.

Further, monitoring slot may be configured differently per resource set and/or search space.

In a wideband, due to small bandwidth supported compared to the wideband, there may be different subbands defined and different UEs may monitor different subbands. For example, if system bandwidth is 400 MHz, and a UE can support nominally up to 100 MHz, there may be 4*100 MHz in the system. To simplify the design, UE bandwidth X (e.g. 100 MHz) may be assumed to be nominal. UEs supporting smaller than X may not be optimized in the system design.

The bandwidth partitioning or subband formation may be propagated by PBCH and/or SIB. In terms of partitioning, the size may be defined as X. In each subband, synchronization signals for cell detection and necessary RS transmission for measurement may be transmitted. PBCH and/or SIB may also be transmitted to support PBCH/SIB update without requiring retuning of a UE to different frequency. For each UE, search space or control-resource set (CORESET) where the UE may monitor GCCC may be configured.

Figure 8:
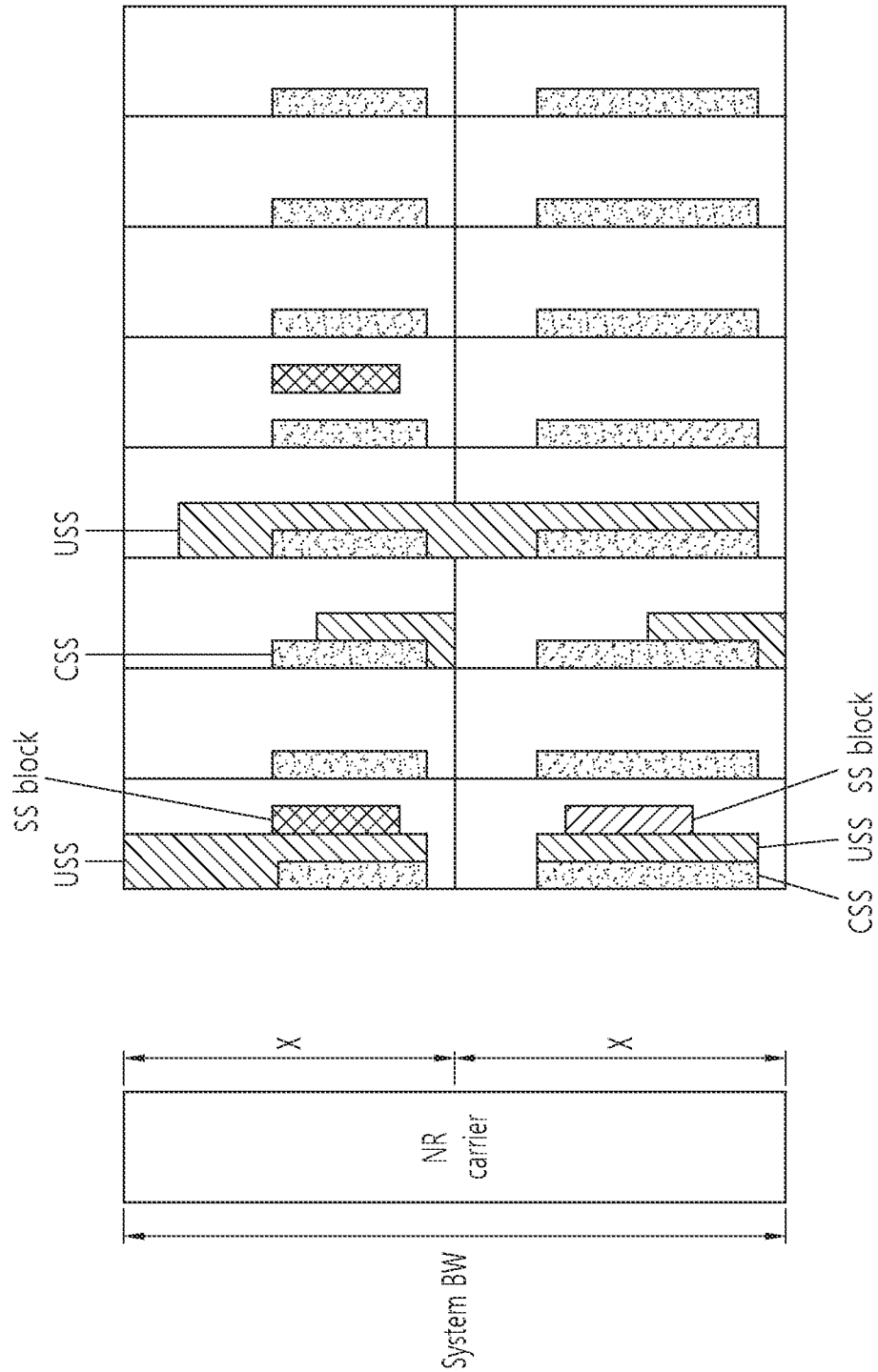
FIG. 8 shows an example of subband formation according to an embodiment of the present invention.

FIG. 8 shows an example of subband formation according to an embodiment of the present invention. Referring to FIG. 8, in each subband with bandwidth X, synchronization signals and/or PBCH/SIB may be transmitted with potentially different frequency, sequence. If X is small, there may be subbands without additional synchronization signals.

CSS in each subband may be configured so that all UEs can monitor the CSS in the configured subband. If there are UEs with smaller bandwidth, small bandwidth CSS may be configured. Also, if a UE can access multiple subbands, one of CSS may be configured to the UE as the primary search space. Also, the resource allocation or resource region where CSS covers may be indicated. This is particularly necessary when GCCC is transmitted separately per subband, and a UE which can access more than one subband may listen only one CSS. A UE may be configured that GCCC from the CSS can cover multiple subbands or not. Alternatively, a UE needs to receive GCCC from each subband.

When a subband is defined, an anchor subband may carry initial SS block which can be accessed by RRC-IDLE/INACTIVE UEs as well. For other subbands, additional SS block may be transmitted with different periodicity or same periodicity compared to initial SS block.

The information of subband compared to SS block may be known/indicated to the UE, and resource may be allocated based on subbands where a UE monitors. In terms of resource allocation/scrambling, the following options may be considered.

(1) PRB indexing may be done locally within a subband. A UE accessing multiple subbands may have resource allocation over multiple subbands with subband index, and scrambling may be done separately per each subband.

(2) PRB indexing may be done per system bandwidth, and scrambling may be done locally. In terms of resource allocation, different number of PRBs may be allocated based on the configured subbands of a UE. And depending on the allocated bandwidth, different UEs may have different starting physical RB index even though they are monitoring the same subband.

(3) PRB indexing and scrambling may be done in system bandwidth. Considering that system bandwidth may not be known to UEs, PRB indexing may be done based on indication to a reference point (e.g. virtual PRB 0) assuming some virtual maximum RBs of system bandwidth.

CSS, particularly CSS where a UE monitors GCCC, fallback, TPC, etc., may be configured by MIB/SIB or UE-specific signaling when reconfiguration of subband occurs. Alternatively, the same configuration of CSS may be present in every subband, and a UE may assume the same configuration from the anchor subband CSS configuration except for the physical frequency location, and thus, no additional information may be necessary. The CSS in a subband, though, may be reconfigured via PBCH/MIB. If PBCH/MIB reconfigure CSS for a subband, there may be the following two mechanisms.

(1) PBCH/SIB in each subband may carry all information of all subband CSS so that a UE can acquire the information from any PBCH/SIB of a subband.

(2) PBCH/SIB in each subband may carry information of the given subband CSS only so that a UE needs to retune to different subband to acquire PBCH/SIB.

In PBCH/SIB, the information of synchronization signals and/or PBCH/SIB transmission of subbands may be indicated so that a UE can acquire PBCH/SIB from the given PBCH/SIB. All the information including configuration of CSS may also be given by UE-specific configuration when retuning occurs. But subband PBCH/SIB may carry different information of CSS. If different PBCH/SIB is transmitted, SIB update may still be applicable to all PBCH/SIBs of all subbands. A UE may acquire PBCH/SIB in any subband, as the contents are basically same with some different options in terms of subband size, CSS configuration, etc., which are specific to subband. Whenever a UE switches subband, the UE may require to acquire such subband-specific information again.

Figure 9:
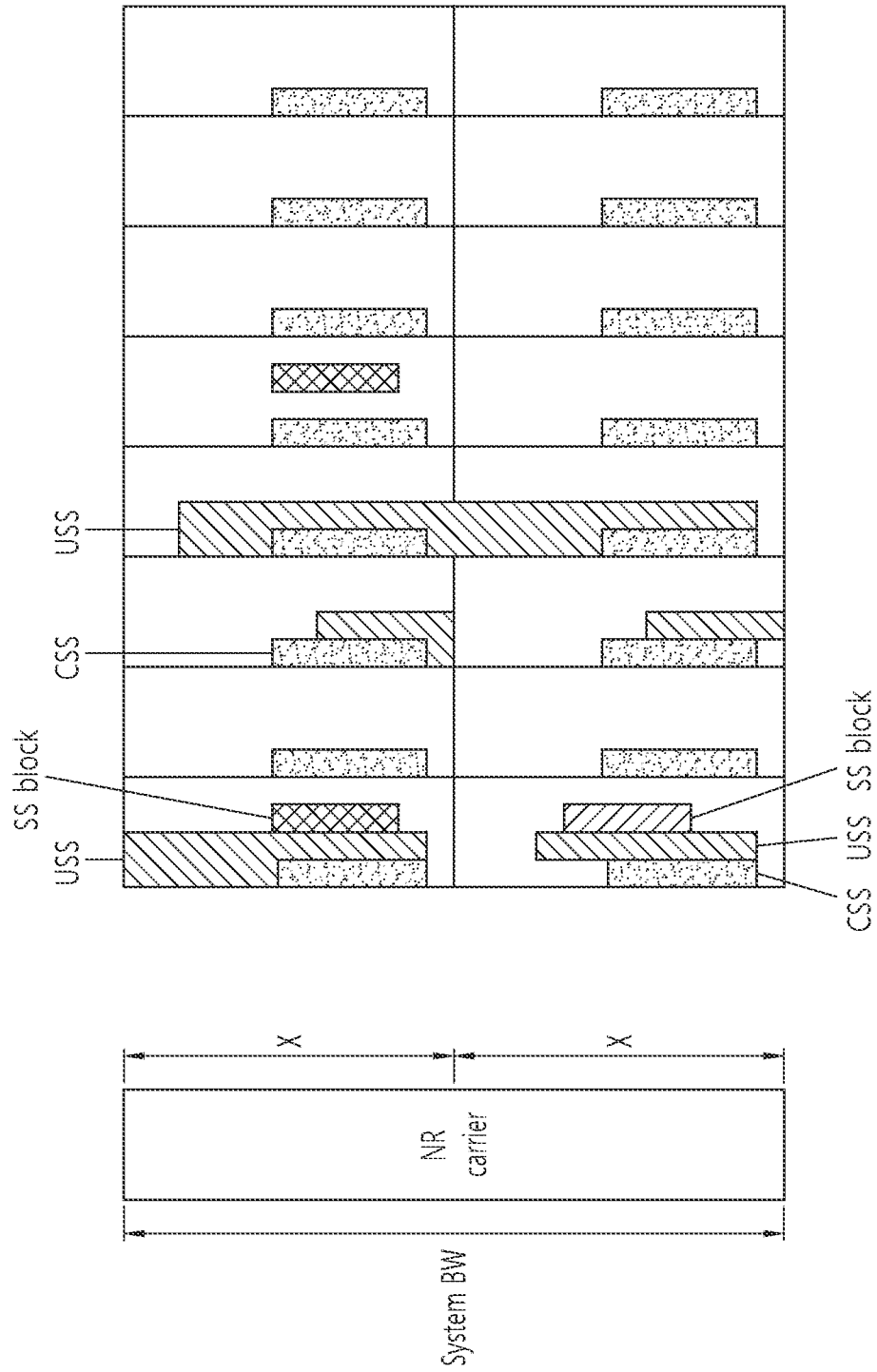
FIG. 9 shows an example of CSS formation according to an embodiment of the present invention.

FIG. 9 shows an example of CSS formation according to an embodiment of the present invention. FIG. 9 assumes the same configuration as FIG. 8. PRB indexing can be based on SS block, as least when PRB indexing occurs locally. The RB indexing may start from the center of SS block or PSS, and may be expanded to the subband size. When a UE is reconfigured with different subband, the center location of SS block or center of PSS may be indicated with subband size, which may define the resource mapping in the configured subband as well. Due to channel raster, it may not be possible to place SS block within a center of a subband. If those cases are considered, based on indicated direct current (DC) subcarrier or center of an anchor subband from PBCH/SIB, resource block may be formed locally within an anchor subband.

5. Resource Allocation

In NR, due to various reasons, time resource may not be contiguously available. In this sense, resource allocation may be done via dynamic scheduling, in both frequency and time domain, or only in frequency domain or only in time domain. In other words, NR may support various resource allocation. Accordingly, different granularity in terms of frequency or time resource may be allowed. For example, the size of subband used for frequency domain may be variable, or may be configurable by higher layer signaling, or implicitly adapted depending on the bandwidth change or other reasons (restricted of bandwidth).

Furthermore, indication of time and frequency resource or time resource only or frequency resource only may be allowed. For example, when there is only one UE per beam in most cases, it may be desirable that all the frequency resources (only available) are used for single UE, which may eliminate the necessity of resource allocation in frequency domain. If only a few UEs are allocated, the all frequency resources may be divided into a few blocks (e.g. to the maximum number of UEs schedulable in one time), and then how many blocks are assigned to each UE may be indicated. The number of frequency blocks in the entire system bandwidth for a given UE (i.e. from UE-specific bandwidth perspective) may be indicated via higher layer signaling or dynamic signaling or via scheduling. Also, the assigned number of blocks may also be indicated and the allocation may be done either bitmap manner or contiguous allocation manner. To realize this, the following approaches may be considered.

(1) Frequency blocks may be divided semi-statically, e.g. based on the maximum possible number of UEs, then resource allocation of each block to UE may be indicated either via bitmap or start/end block indication.

(2) Frequency blocks may be divided into a few candidate numbers (e.g. 1, 2, 4 or max number of UEs), which may be dynamically indicated via scheduling (e.g. first grant). The actual resource allocation size may be different depending on the chosen candidate. For example, if 1 is selected, resource allocation in the next step in frequency domain may be omitted.

(3) A few patterns may be defined and one pattern may be indicated. For example, patterns may include {(full bandwidth), (upper half bandwidth), (lower half bandwidth), (¼th upper bandwidth, ²⁄₄th upper bandwidth, ¾th bandwidth, 4/4th bandwidth), etc.}. In other words, combination of the number of frequency blocks and the allocation may be done. The set of patterns may be configured by higher layer, and the bandwidth size may also be configured to the UE.

Similarly, for time-domain resource, the following approaches may be considered.

(1) Unless otherwise configured (via semi-static signaling), a UE may assume that all DL portions are available for DL data reception. In this case, a UE may be only configured with the number of slots in which one transport block (TB) is spanning.

(2) A UE may assume that all resources may not be used for data transmission. Only time resources indicated by DL scheduling or UL grant may be valid for DL or UL. In this case, the indication mechanism may be as follows.

Bitmap to indicate the available OFDM symbols in a slot or within multi-slots: Multi-slots size may be configured by higher layer, or indicated by DCI.
  Contiguous: For example, starting and duration of data transmission may be indicated by DCI.
  Time-domain resource block group (RBG) concept: OFDM symbols may be grouped to a time-domain RBG, and individual resource mapping per each time-domain RBG may be considered. One example of time-domain RBG is to use mini-slot size. Mini-slot size may be configured by higher layer. In each time-domain RBG, independent bit may be used to indicate whether the time-domain RBG is used for scheduling or not. To minimize dynamic size change of time-domain RBG when dynamically slot and multi-slots are used for scheduling, time-domain RBG size may be adapted depending on the used number of slots. For example, if one slot is used, time-domain RBG size may become 2 OFDM symbols. If 2 slots are used, time-domain RBG size may become 4 OFDM symbols. If 4 slots are used, time-domain RBG size may become 8 OFDM symbols. Instead of bitmap of each time-domain RBG, similar to frequency domain resource allocation, within each time-domain RBG, one or more OFDM symbols may be selected for scheduling by adding a few bits which are commonly applied to all time-domain RBGs.

If time-domain resource allocation is also used, this may be used for indicating various blank resources due to various reasons. One example is not to map data in CSI-RS resources which are destined to different UEs from the scheduled UEs on the resource. Another example is to avoid legacy LTE protected region such as cell-specific reference signal (CRS), PDCCH, etc.

(3) Time resource indication may be necessary in the following cases.

To mute around CSI-RS transmission for different beam(s) than the beam used for data transmission (mostly TX beam)
  To mute around SRS transmission for different beam(s) that the beam assumed for data transmission (mostly RX beam)
  To mute around forward compatible resources
  To mute around inter-cell interference coordination (ICIC) protected resources (e.g. LTE PDCCH, LTE CRS, protected region)
  To schedule multi-slot scheduling or multi-mini-slot scheduling (4) In terms of time resource, the duration or resource size may be configured (e.g. the maximum slot size)

(5) Time-domain resource may be grouped in a mini-slot or a set of OFDM symbols and resource allocation may be applied per each group. In terms of resource allocation, contiguous or time resource group based approach may be considered. Joint indication between frequency and time may also be considered.

Similar mechanisms may also be applied to common search space or group-specific search space and the configuration may be done via common signal such as SIB/MIB and/or group-cast.

As indication of both time and frequency domain may lead considerable overhead, whether time and/or frequency resource allocation is used may be indicated. Further, whether granularity of time/frequency resource is done by adopting two-level or multi-level DCIs may also be indicated. The first level DCI, which may be shared among multiple UEs or done by common signal mentioned in the present invention, may indicate the granularity of resource and/or resource allocation type. Depending on the indication, the resource allocation size and/or interpretation may be different. For UEs which may not be able to successfully decode common signal at least in some cases, a default setting may be used.

To indicate unavailable time/frequency resources, in addition to common signal for resource allocation type/granularity indication, invalid time/frequency resource may also be indicated via common signal. Depending on signaling, the UE assumption on different channel may be different. The followings are examples.

Common signal may indicate available time/frequency resources for all channels. For example, DL/UL slot type or DL/UL size may be commonly indicated.

Common signal may indicate available time/frequency resources for all channels except for data channels. For example, the available resources may be scheduled via dynamic scheduling (UE-specifically), and common signal may indicate the available resource for other channels such as CSI-RS, PUCCH, SRS, etc. More generally, the signal may be applied to channels in which resource may not be dynamically indicatable (e.g. periodically configured channels, or channels with semi-static configuration for the resources). For other channels, dynamic indication via scheduling may be used.

Common signal may indicate minimum available time/frequency resources and additional resources may be indicated to UE via dynamic scheduling. When this approach is used, unless additional indication is received, all channels may assume that the indicated resource by common signal is the only available resources. To handle the missing case, default minimum available time/frequency resource may be preconfigured.

Common signal may indicate maximum available time/frequency resource and additional restriction may be indicated to UE via dynamic scheduling. When this approach is used, unless additional indication is received, all channels may assume that the indicated resource by common signal is the available resources. To handle the missing case, default available time/frequency resource may be preconfigured.

As common signal may be indicated per different UEs by grouping based on different reasons (e.g. used numerology, usage scenario, service type, etc.), a UE may have to search more than one common signal(s). In terms of actual configuration/indication, instead of direct configuration of time/frequency resource, index from pre-configured patterns may be considered. One example of pre-configured patterns may be as follows.

[00110110011011]: First, second, 4th symbols are not available in each 7 OFDM symbols.

[001111111111111]: first and second symbols are not available (e.g. multicast broadcast single-frequency network (MBSFN)).

[0111111111111111]: only first symbol is not available.

[111111111100000]: Downlink pilot time slot (DwPTS) region size is 9 OFDM symbols for DL. Depending on GP size, uplink pilot time slot (UpPTS) size may be 1, 2, 3, 4 (GP size becomes 4, 3, 2, 1).

6. Blank/Punctured Resource Indication

When eMBB/URLLC are multiplexed or some resources (e.g. invalid OFDM symbols) are not available, indication mechanism of blank resource needs to be considered.

(1) Indication Mechanism

Common signal (CSS or UE-group search space) which contains information on positions of indication signal may be indicated, and actual indication signal at the indicated position may also be indicated. Common signal may indicate the possible positions in which indication signal can be actually transmitted. In the indicated position, actual indication signal may be transmitted. For example, to support URLLC and eMBB data, possibly DL-centric slot type and DL-UL-symmetric slot type may coexist. If the network has any URLLC UL data, the network may switch the slot type from DL-centric to DL-UL-symmetric slot type. In this case, the indicated position may be middle OFDM symbol or the starting OFDM symbol of UpPTS of DL-UL-symmetric slot type. If the indication signal indicates the DL symbol there, the UE may assume that DL-centric slot type is used.

Alternatively, positions of mini-slot may be indicated, and each mini-slot may indicate DL or UL which are maintained until the next indication position. To change the slot type, indicated positions may include (1) first OFDM symbol of UpPTS in UL-centric slot type, (2) first OFDM symbol of UpPTS in DL-UL-symmetric slot type, and (3) first OFDM symbol of UpPTS in DL-heavier slot type. DL-UL-symmetric slot type may refer e.g. DDDDDDDGUUUUUU or DDDDDDGUUUUUUU or DDDGUUU. UL-centric slot type may refer e.g. DGUUUUU or DGUUUUUUUUUUUU. DL-heavier slot type may refer e.g. DDDDGUU or DDDDDDDDDGUUUU (i.e. DL portion is larger than UL portion). The indication may be implicit or explicit. When implicit indication is used, the position for sensing gap in which UEs or the network may perform sensing for some other on-going high priority data transmission may be used. High priority transmission may include the followings.

LTE transmission if LTE/NR coexist in LTE spectrum
DL transmission in DL intended resources
UL transmission in UL intended resources
URLLC traffic over eMBB
Any high priority transmission configured by the network The indication may include both time and frequency information where indication or sensing should be transmitted or occurred. Common signal may indicate index from a set of preconfigured or configured patterns of time/frequency resources. In addition to indicated position, indication type or indication reason may also be configured. For example, indication type or reason may be as follows.

Cross-link interference mitigation (sensing may be required): Valid/invalid resource for UL in intended DL resource or valid/invalid resource for DL in intended UL resource URLLC puncture eMBB (indication may be signaled)

(2) UE Behavior on the Indicated Resource

The UE may detect indication signal. The indication signal may be multiplexed with DL data. When the UE detects indication signal, depending on the priority of data transmission/reception of on-going, the UE may perform different things. For example, eMBB UEs may assume that indication means invalid resource or blank resource where the indication is applied, and may treat the resource either as punctured or postponed. Indication may also include validity and a UE may assume the indicated resources are valid only if the signal/indication is detected.

The UE may perform sensing. For example, when a UE schedules UL, on the indicated positions, the UE may sense whether there is any on-going DL transmission or not. If sensing shows no DL transmission, the UE may continue UL transmission. When sensing, the UE may also sense URLLC UL transmission, and then can stop UL transmission.

The UE behavior may be configured by the network. Depending on UE type and usage scenarios, etc., the behavior may be configured by the network. For example, the UE may assume invalid resource or assume valid resource. Or, the UE may puncture or rate matching or perform sensing or sensing target, e.g., neighbor cell or other UEs or URLLC traffic, etc.

(3) Examples

For cross-link interference mitigation, in intended DL resource, indication on invalid resource may be indicated for UL resource. The indication signal may indicate either valid or invalid. A UE transmitting in such resource may sense the configured/indicated resource or detects the indication signal, and if the sensing results shows IDLE or indication shows valid resource, UL transmission may be continued. Otherwise, UL transmission may be dropped, punctured, rate matched on the resources affected by the indicated/sensing position. The affected resource may be defined between two indication points (i.e. from the current indication point to the next indication point).

For cross-link interference mitigation, in intended UL resource, indication on invalid resource may be indicated for DL resource. Different from the above description, if sensing is used, sensing may be occurred by the network rather than UEs. When sensing fails, the network may stop transmission. To avoid UE buffer corruption, additional indication may also be considered and actual sensing may be occurred before the indication. To support this, blank resource for sensing of the network and indicated position may be separately or jointly configured/indicated by common signal. Or, a UE may blindly search some signal/RS after indication point to detect whether the transmission continues or not.

eMBB DL puncturing: if puncturing is possible due to URLLC DL or URLLC UL on eMBB DL transmission, the indication may indicate whether the puncturing has been occurred or not. In case of URLLC UL and eMBB DL, indication may not be feasible to be transmitted. Thus, UEs may assume that the resource are stolen if indication is not detected.

eMBB UL puncturing: similar to DL, UL puncturing may also occur to transmit URLLC DL or URLLC UL. In this case, explicit indication on invalid resource indication may be used and UEs may assume that the resources are invalid only if indication signal(s) is detected. Otherwise, the UE may continue UL transmission. In this case, it is more efficient to transmit UL via mini-slot design in which gap or indication position may be placed between mini-slots.

In terms of puncturing indication, as it is difficult to indicate prior to the transmission, post transmission indication may be considered, and common signal may be transmitted at the end of subframe/slot or in the beginning of the next slot. When the common signal is used for puncturing indication, common channel may be present only when puncturing has occurred. As the next slot/subframe may not have control region, the first available slot/subframe with control region may transmit indication. As different UEs may have different information about available slot/subframe, the gap between punctured slot/subframe to the indicated subframe may be fixed (e.g. 1). When UE-specific indication of puncturing is used, resource allocation for retransmission may include puncturing indication. If such signaling is adopted, it is not required that all UEs need to detect common signal. Only UEs scheduled with data may search the signal.

Common signal may also be used for stopping UL transmission. If a UE detects common signal, the UE may halt any UL transmission in the current or next few slots. Or, simply a UE may cancel all the scheduled UL by dynamic DCI. If a UE is transmitting multi-slot UL transmission, the UE may drop the rest of UL transmission once common signal is detected. If this signaling is used, the signaling transmission may be aperiodic and signaling may be transmitted only if puncturing is occurred. This may be associated with slot type and the puncturing may be indicated along with reserved resources. In case of puncturing, the indication type may indicate backward or for previous slot/subframe. If puncturing indication via common signal is used, and code block (CB)-group based ACK/NACK is used, ACK/NACK for punctured CBs and CBs with low signal-to-interference and noise ratio (SINR) (or low signal quality) may be separately indicated so that redundancy versions (RVs) may be constructed differently. Common signal for puncturing case may also be used for inter-cell URLLC transmission and a UE in a cell may overhear common signal from another cell which can indicate puncturing indication. If those punctured resource may have higher interference level and requires emptying the received resource due to higher interference level of URLLC, it may also be indicated to the network for recovery (or retransmission of system information bits).

7. NR/LTE Coexistence

When NR is deployed in LTE spectrum either co-channel or in adjacent carrier, to maximize resource utilization, blank resource may be indicated dynamically for NR. Blank resource may include resources necessary for LTE operation. For example, the number of OFDM symbols used for legacy PDCCH, whether the subframe is used for LTE transmission or not, or subframe type, etc., may be indicated. Particularly when LTE and NR cells are collocated or connected via ideal backhaul, NR cell may know dynamic scheduling information. Otherwise, NR cell may listen on LTE control region (at least partially, e.g. read physical control format indicator channel (PCFICH), SIB, etc.) over air signaling between LTE and NR. Based on the information, NR cell may determine the starting position of slot or control region. The starting position or the set of valid or invalid resources may be indicated in the dedicated/reserved resource.

One example of dedicated/reserved resource for common signal transmission is to utilize guard band of LTE band. For example, if NR band has smaller guard band via filtering, guard band may be utilized for some signaling transmission. Alternatively, time/frequency region for common signal transmission may be reserved for NR.

Figure 10:
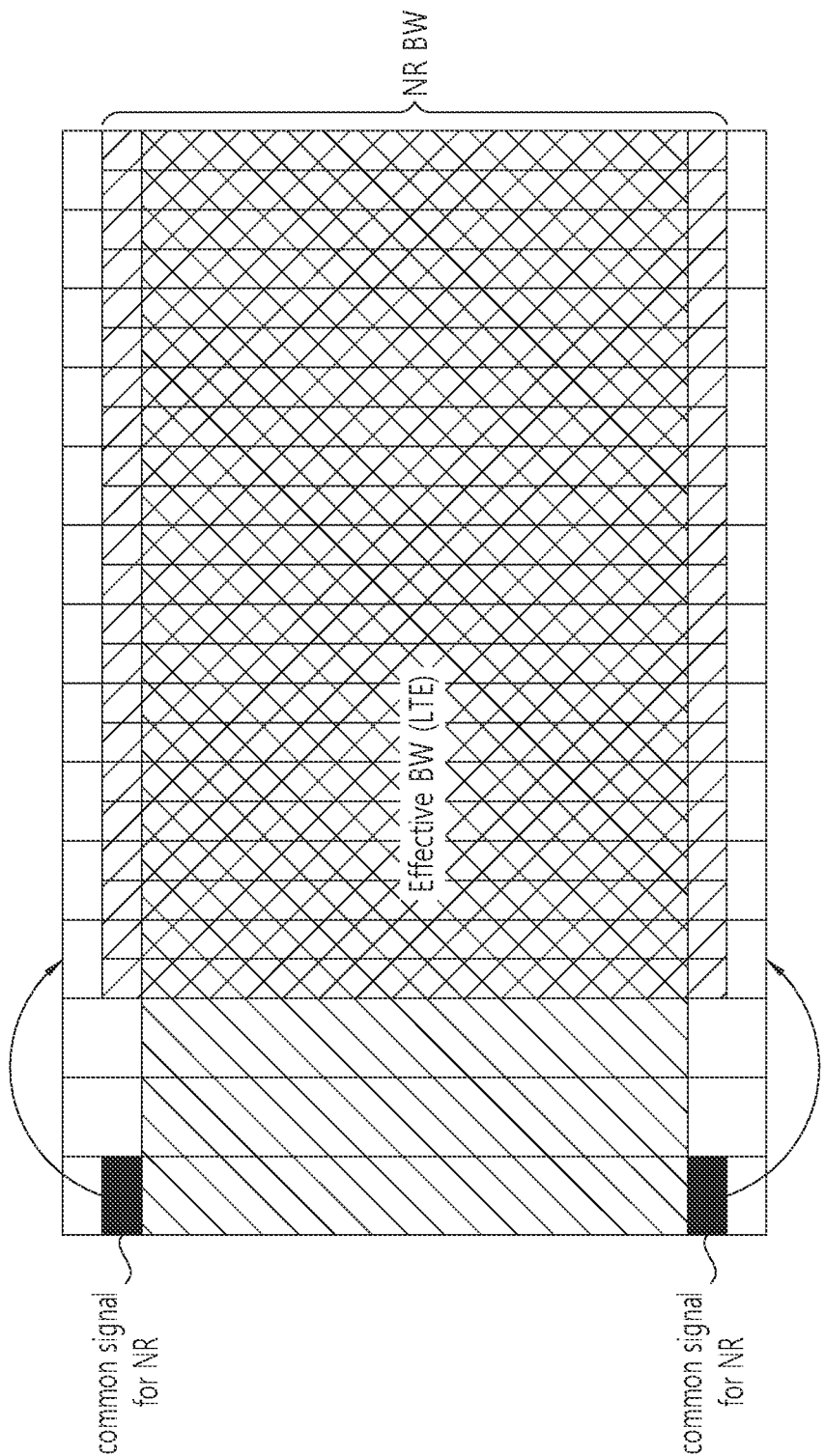
FIG. 10 shows an example of utilizing a guard band for common signal according to an embodiment of the present invention.

FIG. 10 shows an example of utilizing a guard band for common signal according to an embodiment of the present invention. Referring to FIG. 10, NR transmission occurs with 30 kHz subcarrier spacing and its transmission starts from 4th OFDM symbol.

The common signal may indicate at least one of a starting position from which NR starts transmission (e.g. the number of legacy PDCCH region), a set of symbols usable for NR (e.g. blank OFDM symbols or available OFDM symbols for NR transmission), or a pattern of available resource. The possible patterns may be as follows.

1 first OFDM symbol used for legacy PDCCH+2/4 port CRS TX normal subframe (2 or 4 ports may be configured/indicated by higher layer)

2 first OFDM symbol used for legacy PDCCH+2/4 port CRS TX normal subframe (2 or 4 ports may be configured/indicated by higher layer)

3 first OFDM symbol used for legacy PDCCH+2/4 port CRS TX normal subframe (2 or 4 ports may be configured/indicated by higher layer)

1 first OFDM symbol used for legacy PDCCH+2/4 port CRS TX MBSFN subframe (2 or 4 ports may be configured/indicated by higher layer)

2 first OFDM symbol used for legacy PDCCH+2/4 port CRS TX MBSFN subframe (2 or 4 ports may be configured/indicated by higher layer)

When a pattern is configured, the UE may assume that NR portion may start at the available resource. In terms of handling of unavailable resource, rate matching or puncturing may be considered. Rate matching means that control, RS or data are pushed to the next OFDM symbol if the current symbol is not available or rate matched. Rate matching may be applied only on control channel and associated RS. Data and demodulation reference signal (DM-RS) for PDSCH may be punctured in unavailable resources. It may be generally desirable to fix DM-RS position of data and also control to the OFDM symbol(s) which are generally available to NR if the slot is available for NR. To minimize the misbehavior, a default behavior may be as follows.

3 OFDM symbols may be used for legacy PDCCH (assuming 1.4 MHz system bandwidth is not supported)

CRS (if present) may puncture NR transmission

If this is assumed, control region or slot may start at 4th OFDM symbol. When 30 kHz subcarrier spacing is used, the slot size of each slot may be as 11 OFDM symbols (in total of 22 OFDM symbols within 1 ms, excluding 3 15 kHz OFDM symbols). Or, the first slot may be rate matched or punctured only.

FIG. 11 shows an example of patterns for coexistence of LTE and NR according to an embodiment of the present invention. FIG. 11-(a) shows a case of equal slot size based on semi-static configuration. FIG. 11-(b) shows a case of equal slot size assuming all available resource. In this case, if common signal indicates that more resources are available, the available resource by the common/dynamic signaling may be used for data portion. Even in this case, control region may be rather fixed, and remaining portions may be used for data. To improve reliability, DCI may indicate a starting OFDM symbol of data earlier than the control region. In FIG. 11, DCI may indicate data transmission at −4 OFDM symbols. DM-RS position(s) of data may rather be fixed based on the semi-static configuration or fall back configuration. When available/unavailable resource sets are configured, one signal may contain information over multi-slots rather than per slot basis. The resource may include both time and frequency.

This may be generally applied to cases where NR may exist stand-alone in a frequency spectrum as well, without loss of generality. Control region may be fixed as the first OFDM symbol in a slot.

8. eMBB/URLLC Multiplexing

Common signal may be used for eMBB/URLLC multiplexing and aid information for URLLC transmission. The followings are examples of possible indication information for eMBB/URLLC multiplexing/scheduling.

Slot prioritized for URLLC: eMBB UEs need to check indication signal on puncturing. This may also be applicable to UL slot type as well.

Slot prioritized for eMBB: URLLC data may not puncture the transmitted data in the slot Reserved resource for eMBB: Protected resources may be indicated via common signal Reserved channels/signals for eMBB: Protected channels/signals in the slot which will not be punctured by URLLC may be indicated via common signal.

Whether the slot can be used for contention based and/or grant-free transmission: If the indication is present, the slot may be usable for contention based or grant-free transmission. Otherwise, the slot may not be used for contention and/or grant-free transmission. With this mechanism, to adjust contention resource dynamically, very large pool for contention resource may be allocated, and then the resource may be activated or deactivated per slot basis or in a multiple slots basis.

If slot type is DL-centric or DL, contention resource may not be available. If slot type is UL centric or UL, contention resource may be available.

Multiple resource sets may be configured and activation or deactivation of multiple resource sets may be indicated via dynamic possibly common signaling.

9. Assistance on UE Blind Detection Reduction

One use case to utilize common signal is to indicate or assist UE control channel blind detection reduction. As long-term scale blind detection reduction may be done by either semi-static signaling or dynamic bandwidth adaptation, overall blind detection reduction may be done per slot-basis. That is, blind detection reduction may occur in the slot or in the next slot in which common signal has been transmitted/received. For the best quality, common signal for blind detection reduction assistance may be transmitted in the previous slot. The transmission point of common signal or gap between common signal and a slot where common signal is applied may be configured (the gap may be 0, 1 . . . etc.). The information about control region size may be inserted with CRC on the common channel or scrambling may be used differently depending on the size of control region size. In other words, the control region size in time domain may be transmitted opportunistically if common signal is transmitted, and the information may be embedded as CRC or scrambling, to minimize payload size.

If common signal is for multiple carriers, the control region size is only for the carrier where the signal is transmitted. In other words, other carriers without common signal transmission may not transmit control region size dynamically. Furthermore, saving of blind detections with common signal may be configured or applied only when a UE expects that CCEs are mapped in frequency first manner. In other words, PDCCHs are rather confined within OFDM symbols. Alternatively, if control region size is fixed and some resources are fixed regardless of common signal to indicate control region size, time-first mapping may be used within the fixed resource, and frequency first mapping may be used within flexible resource. If scrambling or CRC is used to deliver control region size, if common control is not configured or not transmitted, CRC or scrambling may be done in some other cell-common RS transmissions such as CSI-RS, tracking RS, measurement RS, etc. If common signal is transmitted from the previous slot, blind detection reduction in terms of numbers, percentages, etc., may also be considered. Another approach of blind detection reduction is to indicate a set of UE groups which are scheduled in the current or next slot instead of control region size. This may be done via M bits bitmap, where M may be the number of UE groups. A UE based on its RNTI or UE-ID may determine its group, and does not perform blind decoding if the group does not have scheduling indication.

For another possible blind detection reduction, at least cross-subframe/slot scheduling may be used, the starting of data may not be smaller than end of control region. For example, if a UE is scheduled with data starting at 3rd OFDM symbol in n+4, a UE, au assume that control region size is 2 symbols in slot/subframe n+4, regardless of configurations. However, control resource sets may not cover the entire UE bandwidth where the UE monitors control and/or data. In that case, PDSCH starting may be indicated as earlier than the end of control region. In this case, data may be rate matched on the configured control resource sets. Whether a UE can assume that control region size is smaller than the starting of data transmission or not for cross-subframe/slot scheduling may be configured/informed by higher layer. This may not be true for the same-slot/sub-frame scheduling, as control region size of USS can be longer than the starting of data transmission. If there is indication whether a UE can assume TDM between control region and data region via explicit or implicit indication, it may also be applied to same-slot/subframe scheduling.

One useful case of blind detection reduction by indicating control region size is the case that cross-carrier scheduling of common signal is achieved by a carrier with larger subcarrier spacing to another carrier with smaller subcarrier spacing. In this case, the information may be applied to the same slot where cross-carrier scheduling applied, or to the next slot after cross-carrier scheduling is received. If this case is supported, control region size for a carrier may be included in the content of common signal, and common signal may be transmitted via cross-carrier scheduling. Control region size may also be indicated as a part of slot type indication, and no additional information may be necessary if UL-centric or UL or reserved slot type is indicated, as control region in such cases are clear. Additional control region size may be indicated only if DL centric or DL slot is indicated where the size of control region may be additionally transmitted. Joint transmission of slot type and control region size may also be considered as follows as examples.

[1 symbol DL-control, DL-centric, 1 symbol UL-control], [1 symbol DL-control, DL-centric, 2 symbol UL-control]

[2 symbol DL-control, DL-centric, 1 symbol UL-control], [2 symbol DL-control, DL-centric, 2 symbol UL-control]

[3 symbol DL-control, DL-centric, 1 symbol UL-control], [3 symbol DL-control, DL-centric, 2 symbol UL-control]

[1 symbol DL-control, UL-centric, 1 symbol UL-control], [1 symbol DL-control, UL-centric, 2 symbol UL-control]

[2 symbol DL-control, UL-centric, 1 symbol UL-control], [2 symbol DL-control, UL-centric, 2 symbol UL-control]

[3 symbol DL-control, UL-centric, 1 symbol UL-control], [3 symbol DL-control, UL-centric, 2 symbol UL-control]

Other patterns may also be considered. The above patterns may be potentially subsets of possible configurations. The slot type of multiple slots excluding fixed DL or UL or reserved slots or fixed DL/UL slots, if periodically common signal is transmitted, may be transmitted.

If control region size is indicated via common signal, it needs to be clarified whether the signaling is applied to all UEs' control region or some UEs only. The UEs receiving the corresponding group common RNTI may assume that the same size may be applied to all configured control resource sets. If different size are applied or configured to each control resource set, common signal may indicate unmapped control region in OFDM symbols, instead of control region size. For example, if control region size is configured as 3 OFDM symbols semi-statically, and common signal indicates that two symbols are unmapped for control region, a UE may assume that 1 OFDM symbol is used for control region. By this way, the same reduction may be applied to all configured resource sets which can lead still different control resource set sizes in time domain. Alternatively, different group common RNTI may be configured to each or a subset of resource sets as well, and different indication may be expected.

In millimeter wave (mmWave) environment, it is challenging to transmit common signal. If common signal is adopted, whether there will be scheduling to the same beam direction in the next slot or not may be indicated. For example, if the network has transmitted beam 1, 3, 5 in slot n, for each beam 1, 3, and 5, the network may indicate whether there will be control scheduling to beam 1, 3, and 5 or not respectively. If scheduling is not indicated for the next slot, a UE may skip decoding on the next slot if the UE is configured with the beam(s). Also to minimize blind decoding on resources used for different beams than the configured beams from a UE perspective, a set of candidate OFDM symbols may be determined based on a function or a rule. For example, if a UE supports total of N beams, and maximum K beams can be transmitted per slot, and a UE expects about P times of monitoring occasions during N/K slots, a UE may monitor control region in slots $N*P/K*i+$ UE−ID or RNTI % $N*P/K$, where $i=0, 1, 2 \ldots P-1$. The idea is to distribute monitoring occasions evenly for UEs. Different function can be considered.

Another approach is to map CCEs across multiple slots. The number of slots may be configured by the network dynamically or semi-statically and a UE may access different OFDM symbols for searching candidates based on hashing function. In this case, to allow multiplexing of UEs with the same beam to the same OFDM symbols, the same hashing function may be used among UEs sharing the same beam ID. In other words, hashing function may be based on beam ID or the associated CSI-RS resource index where a UE expects to receive the data. To minimize the collision among UEs with the same beam ID, secondary hashing may be used after applying hashing based on beam ID. Alternatively, hashing function based on beam ID may be performed at OFDM symbol level, and if the network configures K control symbols in each slot over M slots, total of K*M symbols may be available for hashing. The number of candidate symbols, e.g. P, may be selected based on hashing function and the configured offset. Or, P OFDM symbols may be randomly selected based on hashing/randomization functions. Secondary hashing may be performed in the selected symbols.

Figure 12:
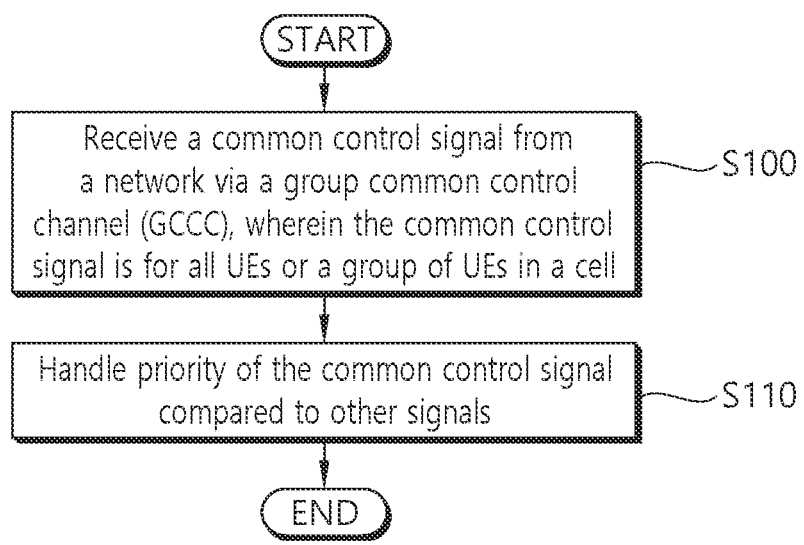
FIG. 12 shows a method for handling priority of a common control signal by a UE according to an embodiment of the present invention.

FIG. 12 shows a method for handling priority of a common control signal by a UE according to an embodiment of the present invention. The present invention described above may be applied to this embodiment.

In step S100, the UE receives the common control signal from a network via a GCCC. The common control signal is for all UEs or a group of UEs in a cell. In step S110, the UE handles the priority of the common control signal compared to other signals.

The priority of the common control signal may be higher than a semi-static UE-specifically configured configuration. The priority of the common control signal may be lower than a cell-commonly or group-commonly configured configuration. The priority of the common control signal may be lower than a dynamic UE-specifically configured configuration.

The priority of the common control signal may be higher than a semi-static configuration when the common control signal indicates a flexible resource. The flexible resource may be determined by a semi-static DL/UL configuration. The flexible resource may be determined by a resource or RS type of the semi-static configuration. The flexible resource may be determined by a configuration method.

The priority of the common control signal may be lower than a semi-static configuration when the common control signal indicates a fixed DL resource or a UL resource.

The common control signal may be received in a subset of candidates or in a first OFDM symbol of a control region or in a frequency region among control resource sets.

The common control signal may indicate at least one of whether a type of a current subframe is UL-centric or DL-centric, whether a type of a next subframe type is UL-centric or DL-centric, whether the current subframe is scheduled with single-level DCI or multi-level DCI, whether the next subframe is scheduled with single-level DCI or multi-level DCI, a size of common or group-specific shared control resource set, or an indication of actual DL resource, UL resource and/or reserved resource.

The common control signal may be received via either self-carrier scheduling or a cross-carrier scheduling.

An exact length of a long PUCCH format may be indicated from the network. The UE may receive a DL data from the network, and transmit a UL control signal to the network via the long PUCCH format.

Figure 13:
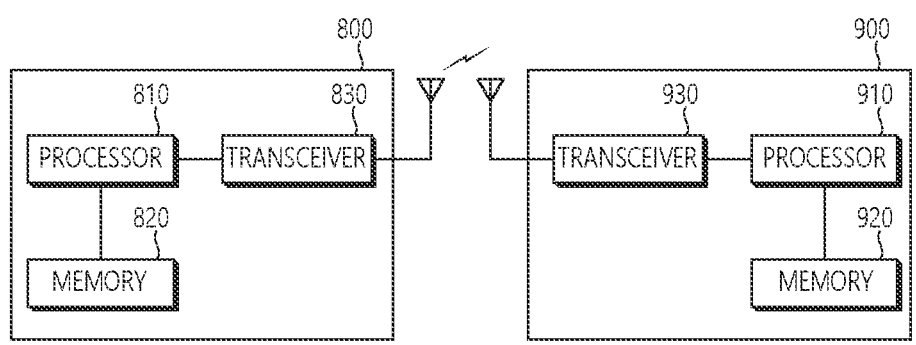
FIG. 13 shows a wireless communication system to implement an embodiment of the present invention.

FIG. 13 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a base station (BS) adapted to operate in a wireless communication system, the method comprising:
  transmitting, to a user equipment (UE), a semi-static channel state information reference signal (CSI-RS) configuration for transmission of a CSI-RS in a resource via downlink; and
  transmitting, to the UE, a group common control signal, wherein the group common control signal is scheduled with a radio network temporary identity (RNTI), wherein the group common control signal is common to a group of UEs, and wherein the resource is indicated as an uplink based on the group common control signal, wherein the group common control signal is prioritized over the semi-static CSI-RS configuration.

2. The method of claim 1, wherein data is received from the UE via the resource indicated as the uplink based on the group common control signal being prioritized over the semi-static CSI-RS configuration.

3. The method of claim 1, wherein the group common control signal is transmitted in a subset of candidates or in a first orthogonal frequency division multiplexing (OFDM) symbol of a control region or in a frequency region among control resource sets.

4. The method of claim 1, wherein the group common control signal is transmitted via either self-carrier scheduling or a cross-carrier scheduling.

5. A base station (BS) adapted to operate in a wireless communication system, the BS comprising:
- a transceiver;
- a processor; and
- a memory operably connectable to the processor and storing instructions that, based on being executed by the processor, perform operations comprising:
  transmitting, to a user equipment (UE) via the transceiver, a semi-static channel state information reference signal (CSI-RS) configuration for transmission of a CSI-RS in a resource via downlink; and
  transmitting, to the UE via the transceiver, a group common control signal, wherein the group common control signal is scheduled with a radio network temporary identity (RNTI), wherein the group common control signal is common to a group of UEs, and wherein the resource is indicated as an uplink based on the group common control signal,
  wherein the group common control signal is prioritized over the semi-static CSI-RS configuration.

6. The BS of claim 5, wherein data is received from the UE via the resource indicated as the uplink based on the group common control signal being prioritized over the semi-static CSI-RS configuration.

7. The BS of claim 5, wherein the group common control signal is transmitted in a subset of candidates or in a first orthogonal frequency division multiplexing (OFDM) symbol of a control region or in a frequency region among control resource sets.

8. The BS of claim 5, wherein the group common control signal is transmitted via either self-carrier scheduling or a cross-carrier scheduling.

9. A method performed by a user equipment (UE) adapted to operate in a wireless communication system, the method comprising;
  receiving a channel state information reference signal (CSI-RS) configuration,
  wherein the UE is configured by the CSI-RS configuration to receive a CSI-RS in a resource via downlink; and
  detecting a group common control signal with a radio network temporary identity (RNTI),
  wherein the group common control signal indicates the resource as an uplink, and
  wherein the group common control signal is prioritized over the CSI-RS configuration.

10. The method of claim 9, wherein data is transmitted via the resource indicated as the uplink based on the group common control signal being prioritized over the CSI-RS configuration.

11. The method of claim 9, wherein the group common control signal is received in a subset of candidates or in a first orthogonal frequency division multiplexing (OFDM) symbol of a control region or in a frequency region among control resource sets.

12. The method of claim 9, wherein the group common control signal is received via either self-carrier scheduling or a cross-carrier scheduling.

13. A user equipment (UE) adapted to operate in a wireless communication system, the UE comprising:
- a transceiver;
- a processor; and
- a memory operably connectable to the processor and storing instructions that, based on being executed by the processor, perform operations comprising:
  receiving, via the transceiver, a channel state information reference signal (CSI-RS) configuration,
  wherein the UE is configured by the CSI-RS configuration to receive a CSI-RS in a resource via downlink; and
  detecting a group common control signal with a radio network temporary identity (RNTI),
  wherein the group common control signal indicates the resource as an uplink, and
  wherein the group common control signal is prioritized over the CSI-RS configuration.

14. The UE of claim 13, wherein data is transmitted via the resource indicated as the uplink based on the group common control signal being prioritized over the CSI-RS configuration.

15. The UE of claim 13, wherein the group common control signal is received in a subset of candidates or in a first orthogonal frequency division multiplexing (OFDM) symbol of a control region or in a frequency region among control resource sets.

16. The UE of claim 13, wherein the group common control signal is received via either self-carrier scheduling or a cross-carrier scheduling.

* * * * *